US012720505B2

(12) United States Patent
Xu et al.

(10) Patent No.: US 12,720,505 B2
(45) Date of Patent: Aug. 25, 2026

(54) GRADIENT TRANSMISSION METHOD AND RELATED APPARATUS

(71) Applicant: HUAWEI TECHNOLOGIES CO., LTD., Shenzhen (CN)

(72) Inventors: Chen Xu, Hangzhou (CN); Gongzheng Zhang, Hangzhou (CN); Jian Wang, Hangzhou (CN); Rong Li, Boulogne Billancourt (FR); Jun Wang, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 225 days.

(21) Appl. No.: 18/486,482

(22) Filed: Oct. 13, 2023

(65) Prior Publication Data

US 2024/0049188 A1 Feb. 8, 2024

Related U.S. Application Data

(63) Continuation of application No. PCT/CN2022/085933, filed on Apr. 8, 2022.

(30) Foreign Application Priority Data

Apr. 16, 2021 (CN) ........................ 202110412895.X

(51) Int. Cl.
*H04W 72/231* (2023.01)
*H04L 41/16* (2022.01)
*H04W 72/04* (2023.01)

(52) U.S. Cl.
CPC ............. *H04W 72/04* (2013.01); *H04L 41/16* (2013.01)

(58) Field of Classification Search
CPC .......... G06N 3/02; G06N 3/042; G06N 3/044; G06N 3/0442; G06N 3/045; G06N 3/0455; G06N 3/048; G06N 3/063; G06N 3/0464; G06N 3/0475; G06N 3/0499; G06N 3/08; G06N 3/084; G06N 3/088; G06N 3/09; G06N 3/091; G06N 3/092; G06N 3/098; G06N 20/00; G06N 20/10; H04B 17/3912; H04B 17/3913; H04L 1/0059;
(Continued)

(56) References Cited

U.S. PATENT DOCUMENTS 11,909,482 B2 * 2/2024 Namgoong ............ G06N 3/047
12,418,333 B2 * 9/2025 Jeon ....................... G06N 3/098
(Continued)

OTHER PUBLICATIONS

Amiri et al., “Federated Learning Over Wireless Fading Channels,”,IEEE Transactions on Wireless Communications, vol. 19, No. 5, May 2020; pp. 3546-3557 (12 total pages).

*Primary Examiner* — Frank Duong
(74) *Attorney, Agent, or Firm* — Rimon PC

(57) ABSTRACT

A first communication apparatus receives training data, and determines a first intermediate gradient based on the training data. The first intermediate gradient is used to update a parameter of a first neural network located in a second communication apparatus. The first communication apparatus maps the first intermediate gradient to an air interface resource to generate a first gradient signal, and sends the first gradient signal to the second communication apparatus. The first gradient signal includes one or more first gradient symbols, and each of the first gradient symbols corresponds to one or more gradient values.

20 Claims, 16 Drawing Sheets

(58) Field of Classification Search
CPC . H04L 1/0071; H04L 1/0075; H04L 25/0254; H04L 25/03165; H04L 2012/5686; H04L 2025/03464; H04L 41/145; H04L 41/16; H04L 45/08; H04W 16/22; H04W 28/18; H04W 72/04; H04W 72/231; Y02D 30/70
See application file for complete search history.

(56) References Cited

U.S. PATENT DOCUMENTS

2023/0289564 A1* 9/2023 Kim ........................ G06N 3/063
2023/0325638 A1* 10/2023 Kim ..................... G06N 3/0464

* cited by examiner

GRADIENT TRANSMISSION METHOD AND RELATED APPARATUS

CROSS-REFERENCE TO RELATED APPLICATIONS

This application is a continuation of International Application No. PCT/CN2022/085933, filed on Apr. 8, 2022, which claims priority to Chinese Patent Application No. 202110412895.X, filed on Apr. 16, 2021. The disclosures of the aforementioned applications are hereby incorporated by reference in their entireties.

BACKGROUND

An increasingly mature artificial intelligence (AI) technology will play an important role in promoting the evolution of future mobile communication network technologies. Currently, AI technology has been applied to a network layer (for example, network optimization, mobility management, and resource allocation), a physical layer (for example, channel encoding and decoding, channel prediction, and receiver), and the like.

AI technology has been applied to a communication system that includes a first communication apparatus and a second communication apparatus, where a main body of the first communication apparatus and second communication apparatus of the communication system includes a neural network. Before the communication system is used, a parameter of the neural network located in the first communication apparatus and/or the second communication apparatus needs to be trained. A training process of the neural network includes forward inference of training data, calculation of a loss function, and reverse transmission of a gradient. The forward inference of training data refers to a process in which the second communication apparatus sends the training data to the first communication apparatus, and the reverse transmission of a gradient means that the first communication apparatus sends back the gradient of the first communication apparatus to the second communication apparatus.

However, when the AI technology is combined with a wireless communication system, how the second communication apparatus obtains the gradient sent back by the first communication apparatus is an urgent problem to be resolved.

SUMMARY

Embodiments described herein provide a gradient transmission method and a related apparatus, to facilitate the completion of joint training at a transceiver end when an AI technology is applied to a wireless communication system.

According to a first aspect, an embodiment described herein provides a gradient transmission method. In this method, a first communication apparatus receives training data, and determines a first intermediate gradient based on the training data. The first intermediate gradient is used to update a parameter of a first neural network located in a second communication apparatus. The first communication apparatus maps the first intermediate gradient to an air interface resource to generate a first gradient signal, and sends the first gradient signal to the second communication apparatus. The first gradient signal includes one or more first gradient symbols, and each of the first gradient symbols corresponds to one or more gradient values of the first intermediate gradient.

It may be learned that in this embodiment, the first communication apparatus maps the first intermediate gradient to the air interface resource for transmission, that is, implements reverse transmission of the first intermediate gradient by sending the first gradient signal to the second communication apparatus, to facilitate the completion of the joint training of the first communication apparatus and the second communication apparatus.

In an optional implementation, the first intermediate gradient is further used to update a parameter of a second neural network located in a third communication apparatus. A communication connection is established between the third communication apparatus and the second communication apparatus. To be specific, when a communication system further includes the third communication apparatus that establishes the communication connection to the second communication apparatus, the second communication apparatus sends back the first intermediate gradient to the third communication apparatus, so that the third communication apparatus updates the parameter of the second neural network based on the first intermediate gradient. This facilitates joint training of the first communication apparatus, the second communication apparatus, and the third communication apparatus.

In an optional implementation, that the first communication apparatus maps the first intermediate gradient to an air interface resource to generate a first gradient signal includes: converting the gradient values of the first intermediate gradient into the one or more first gradient symbols, and mapping the one or more first gradient symbols to the air interface resource to generate the first gradient signal.

It may be learned that the first communication apparatus implements reverse transmission of the first intermediate gradient on the air interface resource by mapping the one or more first gradient symbols to the air interface resource.

In an optional implementation, when the communication system including the first communication apparatus and the second communication apparatus transmits a real number symbol, that is, the first gradient symbol is a real number symbol, that the first communication apparatus converts the gradient values of the first intermediate gradient into the one or more first gradient symbols includes: converting p complex gradient values included in the first intermediate gradient into 2m first real number symbols, where p is a positive integer, and m is a positive integer less than or equal to p; or converting p real gradient values included in the first intermediate gradient into m second real number symbols, where p is a positive integer, and m is a positive integer less than or equal to p.

That is, when the communication system including the first communication apparatus and the second communication apparatus transmits the real number symbol, the first communication apparatus converts the gradient values included in the first intermediate gradient into the 2m first real number symbols or the m second real number symbols. That is, the one or more first gradient symbols include the 2m first real number symbols or the m second real number symbols. In this case, the first communication apparatus maps the 2m first real number symbols or the m second real number symbols to the air interface resource, so that the first communication apparatus may perform reverse transmission of the first intermediate gradient through a wireless air interface.

In an optional implementation, that the first communication apparatus converts p complex gradient values included in the first intermediate gradient into 2m first real number symbols includes: The first communication apparatus determines that a real part and an imaginary part of any one of the p complex gradient values included in the first intermediate gradient are one first real number symbol, to obtain the 2m first real number symbols.

In an optional implementation, that the first communication apparatus converts p real gradient values included in the first intermediate gradient into m second real number symbols includes: The first communication apparatus determines that m of the p real gradients included in the first intermediate gradient are the m second real number symbols. In this implementation, the p real gradient values do not need to be converted, so that signaling overheads of the first communication apparatus can be reduced.

In another optional implementation, when the communication system including the first communication apparatus and the second communication apparatus transmits a complex number symbol, that is, the first gradient symbol is a complex number symbol, that the first communication apparatus converts the gradient values of the first intermediate gradient into the one or more first gradient symbols includes: converting p complex gradient values included in the first intermediate gradient into m first real complex number symbols, where p is a positive integer, and m is a positive integer less than or equal to p; or converting p real gradient values included in the first intermediate gradient into m second complex number symbols, where p is a positive integer, m is a positive integer less than or equal to $\lceil p/2 \rceil$, and $\lceil\ \rceil$ indicates rounding up.

That is, when the communication system including the first communication apparatus and the second communication apparatus transmits the complex number symbol, the first communication apparatus converts the gradient values included in the first intermediate gradient into the m first complex number symbols or the m second complex number symbols. That is, the one or more first gradient symbols include the m first complex number symbols or the m second complex number symbols. In this case, the first communication apparatus maps the m first complex number symbols or the m second complex number symbols to the air interface resource, so that the first communication apparatus may perform reverse transmission of the first intermediate gradient through a wireless air interface.

In an optional implementation, that the first communication apparatus maps the one or more first gradient symbols to the air interface resource to generate the first gradient signal includes: mapping conjugates of the m first complex number symbols or conjugates of the m second complex number symbols to the air interface resource to generate the first gradient signal.

In an optional implementation, that the first communication apparatus converts p complex gradient values included in the first intermediate gradient into m first complex number symbols includes: The first communication apparatus determines that a real part of any one of the p complex gradient values included in the first intermediate gradient is a real part of one first complex number symbol, and determines that an imaginary part of the complex gradient value is an imaginary part of the first complex number symbol, to obtain the m first complex number symbols. That is, the determined real part of the first complex number symbol corresponds to the real part of the complex gradient value, and the imaginary part of the first complex number symbol corresponds to the imaginary part of the complex gradient value. In this implementation, the first communication apparatus maps the conjugates of the m first complex number symbols to the air interface resource to generate the first gradient signal.

In another optional implementation, that the first communication apparatus converts p complex gradient values included in the first intermediate gradient into m first complex number symbols includes: The first communication apparatus determines that an imaginary part of any one of the p complex gradient values included in the first intermediate gradient is a real part of one first complex number symbol, and determines that a real part of the complex gradient value is an imaginary part of the first complex number symbol, to obtain the m first complex number symbols. That is, the determined real part of the first complex number symbol corresponds to the imaginary part of the complex gradient value, and the imaginary part of the first complex number symbol corresponds to the real part of the complex gradient value. In this implementation, the first communication apparatus maps the m first complex number symbols to the air interface resource to generate the first gradient signal.

In an optional implementation, that the first communication apparatus converts p real gradient values included in the first intermediate gradient into m second complex number symbols includes: The first communication apparatus determines that any two of the p real gradient values included in the first intermediate gradient are a real part and an imaginary part of one second complex number symbol, to obtain the m second complex number symbols.

In an optional implementation, the first intermediate gradient mapped to the air interface resource is a first intermediate gradient obtained after power normalization. To be specific, before generating the first gradient signal, the first communication apparatus performs the power normalization on the first intermediate gradient to generate the first gradient signal based on the first intermediate gradient obtained after the power normalization. This may further reduce an error of the first gradient signal.

In an optional implementation, the first communication apparatus further sends feedback information to the second communication apparatus. The feedback information is used to determine the training data. That is, the training data received by the first communication apparatus is determined based on the feedback information. This manner can improve reliability of the training data.

In an optional implementation, when there are a plurality of first communication apparatuses, that the first communication apparatus maps the first intermediate gradient to an air interface resource to generate a first gradient signal includes: The first communication apparatus processes the first intermediate gradient by using a first weight, to obtain a weighted first intermediate gradient. The first communication apparatus maps the weighted first intermediate gradient to the air interface resource to generate the first gradient signal. The first weight indicates a trustworthiness degree of the first intermediate gradient.

It may be learned that, when there are the plurality of first communication apparatuses, each of the first communication apparatuses may process the first intermediate gradient based on the trustworthiness degree of the first intermediate gradient, and map the first intermediate gradient to the air interface resource.

According to a second aspect, an embodiment described herein provides a gradient transmission method. The gradient transmission method in this aspect corresponds to the gradient transmission method in the first aspect, and the gradient transmission method in this aspect is described from a second communication apparatus side. In this method, a second communication apparatus receives one or more second gradient signals. The second gradient signal is a signal obtained after a first gradient signal passes through a channel. The first gradient signal is generated by mapping a first intermediate gradient to an air interface resource. The first gradient signal includes one or more first gradient symbols, and each of the first gradient symbols corresponds to one or more gradient values of the first intermediate gradient. The first intermediate gradient is determined based on training data. The first intermediate gradient is used to update a parameter of a first neural network located in the second communication apparatus. The second communication apparatus determines a second intermediate gradient based on the one or more second gradient signals. The second communication apparatus updates the parameter of the first neural network based on the second intermediate gradient.

It may be learned that in this embodiment, the second communication apparatus receives, by receiving the one or more second gradient signals, the first intermediate gradient sent back by the first communication apparatus, and determines the second intermediate gradient based on the one or more second gradient signals. Then, the second communication apparatus updates the parameter of the first neural network based on to the second intermediate gradient, to complete joint training of a first communication apparatus and the second communication apparatus.

In an optional implementation, the second gradient signals include 2m third real number symbols, the third real number symbol is a symbol obtained after a first real number symbol passes through the channel, and m is a positive integer. That the second communication apparatus determines a second intermediate gradient based on the one or more second gradient signals includes: The second communication apparatus converts the 2m third real number symbols into m complex gradient values of the second intermediate gradient.

In another optional implementation, the second gradient signals include m fourth real number symbols, the fourth real number symbol is a symbol obtained after a second real number symbol passes through the channel, and m is a positive integer. That the second communication apparatus determines a second intermediate gradient based on the one or more second gradient signals includes: The second communication apparatus determines that the m fourth real number symbols are m real gradient values of the second intermediate gradient.

In still another optional implementation, the second gradient signals include m third complex number symbols, a third complex number symbol is a symbol obtained after a first complex number symbol passes through the channel, and m is a positive integer. That the second communication apparatus determines a second intermediate gradient based on the one or more second gradient signals includes: The second communication apparatus converts the m third complex number symbols into m complex gradient values of the second intermediate gradient.

In still another optional implementation, the second gradient signals include m fourth complex number symbols, a fourth complex number symbol is a symbol obtained after a second complex number symbol passes through the channel, and m is a positive integer. That the second communication apparatus determines a second intermediate gradient based on the one or more second gradient signals includes: The second communication apparatus converts the m fourth complex number symbols into 2m real gradient values of the second intermediate gradient.

In an optional implementation, when a communication connection is further established between the second communication apparatus and a third communication apparatus, the second communication apparatus may further generate a third intermediate gradient based on the second intermediate gradient, and map the third intermediate gradient to the air interface resource to generate a third gradient signal. The third gradient signal includes one or more second gradient symbols, and each of the second gradient symbols corresponds to one or more gradient values of the third intermediate gradient. Then, the second communication apparatus sends the third gradient signal to the third communication apparatus.

It may be learned that, when the communication connection is further established between the second communication apparatus and the third communication apparatus, the second communication apparatus further sends back the third intermediate gradient back to the third communication apparatus by using the third gradient signal, so that the third communication apparatus may update a parameter of a second neural network located in the third communication apparatus based on the second intermediate gradient, to complete training of the first communication apparatus, the second communication apparatus, and the third communication apparatus.

In an optional implementation, that the second communication apparatus maps the third intermediate gradient to the air interface resource to generate a third gradient signal includes: converting the gradient values of the third intermediate gradient into the one or more second gradient symbols, and mapping the one or more second gradient symbols to the air interface resource to generate the third gradient signal. It may be learned that the second communication apparatus implements reverse transmission of the third intermediate gradient on the air interface resource by mapping the one or more second gradient symbols to the air interface resource.

In an optional implementation, when a communication system including the first communication apparatus, the second communication apparatus, and the third communication apparatus transmits a real number symbol, that is, the second gradient symbol is a real number symbol, that the second communication apparatus converts the gradient values of the third intermediate gradient into the one or more second gradient symbols includes: converting m complex gradient values included in the third intermediate gradient into 2n fifth real number symbols, where m is a positive integer, and n is a positive integer less than or equal to m; or converting m real gradient values included in the third intermediate gradient into n sixth real number symbols, where m is a positive integer, and n is a positive integer less than or equal to m.

That is, when the communication system including the first communication apparatus, the second communication apparatus, and the third communication apparatus transmits the real number symbol, the second communication apparatus converts the gradient values included in the third intermediate gradient into the 2n fifth real number symbols or the n sixth real number symbols. That is, the one or more second gradient symbols include the 2n fifth real number symbols or the n sixth real number symbols. In this case, the second communication apparatus maps the 2n fifth real number symbols or the n sixth real number symbols to the air interface resource, so that the second communication apparatus may perform reverse transmission of the third intermediate gradient through a wireless air interface.

In an optional implementation, that the second communication apparatus converts m complex gradient values included in the third intermediate gradient into 2n fifth real number symbols includes: The second communication apparatus determines that a real part and an imaginary part of any one of the m complex gradient values included in the third intermediate gradient are one fifth real number symbol, to obtain the 2n fifth real number symbols.

In another optional implementation, when a communication system including the first communication apparatus, the second communication apparatus, and the third communication apparatus transmits a complex number symbol, that is, the second gradient symbol is a complex number symbol, that the second communication apparatus converts the gradient values of the third intermediate gradient into the one or more second gradient symbols includes: converting m complex gradient values included in the third intermediate gradient into n fifth complex number symbols, where m is a positive integer, and n is a positive integer less than or equal to m; or converting m complex gradient values included in the third intermediate gradient into n sixth complex number symbols, where m is a positive integer, and n is a positive integer less than or equal to $\lceil m/2 \rceil$.

That is, when the communication system including the first communication apparatus, the second communication apparatus, and the third communication apparatus transmits the real number symbol, the second communication apparatus converts the gradient values included in the third intermediate gradient into the n fifth complex number symbols or the n sixth complex number symbols. That is, the one or more second gradient symbols include the n fifth complex number symbols or the n sixth complex number symbols. In this case, the second communication apparatus maps the n fifth complex number symbols or the n sixth complex number symbols to the air interface resource, so that the second communication apparatus may perform reverse transmission of the third intermediate gradient through a wireless air interface.

In an optional implementation, that the second communication apparatus maps the one or more second gradient symbols to the air interface resource to generate the third gradient signal includes: mapping conjugates of the n fifth complex number symbols or conjugates of the n sixth complex number symbols to the air interface resource to generate the third gradient signal.

In an optional implementation, that the second communication apparatus converts m complex gradient values included in the third intermediate gradient into n fifth complex number symbols includes: determining that a real part of any one of the m complex gradient values included in the third intermediate gradient is a real part of one fifth complex number symbol, and determining that an imaginary part of the complex gradient value is an imaginary part of the fifth complex number symbol, to obtain the n fifth complex number symbols. That is, the determined real part of the fifth complex number symbol corresponds to the real part of the complex gradient value, and the imaginary part of the fifth complex number symbol corresponds to the imaginary part of the complex gradient value. In this implementation, the second communication apparatus maps the conjugates of the n fifth complex number symbols to the air interface resource to generate the third gradient signal.

In another optional implementation, that the second communication apparatus converts m complex gradient values included in the third intermediate gradient into n fifth complex number symbols includes: determining that an imaginary part of any one of the m complex gradient values included in the third intermediate gradient is a real part of one fifth complex number symbol, and determining that a real part of the complex gradient value is an imaginary part of the fifth complex number symbol, to obtain the n fifth complex number symbols. That is, the determined real part of the fifth complex number symbol corresponds to the imaginary part of the complex gradient value, and the imaginary part of the fifth complex number symbol corresponds to the real part of the complex gradient value. In this implementation, the second communication apparatus maps the n fifth complex number symbols to the air interface resource to generate the third gradient signal.

In an optional implementation, that the second communication apparatus converts m real gradient values included in the third intermediate gradient into n sixth real number symbols includes: The second communication apparatus determines that n of the m real gradients included in the third intermediate gradient are the n sixth real number symbols. In this implementation, the m real gradient values do not need to be converted, so that signaling overheads of the second communication apparatus can be reduced.

In an optional implementation, that the second communication apparatus converts 2m real gradient values included in the third intermediate gradient into n sixth complex number symbols includes: determining that any two of the 2m real gradient values included in the third intermediate gradient are a real part and an imaginary part of one sixth complex number symbol, to obtain the n sixth complex number symbols.

According to a third aspect, an embodiment described herein provides a gradient transmission method. In this method, a first communication apparatus determines a fourth intermediate gradient based on channel information and received training data. The fourth intermediate gradient is used to update a parameter of a first neural network in a second communication apparatus. The first communication apparatus sends a fourth intermediate gradient over a communication link. The communication link is different from a communication link between the first communication apparatus and the second communication apparatus.

It may be learned that in this embodiment, the first communication apparatus performs channel estimation in advance to obtain the channel information, then determines the accurate fourth intermediate gradient based on the channel information and the training data, and sends the fourth intermediate gradient to the second communication apparatus over the communication link, to implement reverse transmission of the fourth intermediate gradient. This facilitates implementing joint training of the first communication apparatus and the second communication apparatus.

According to a fourth aspect, an embodiment described herein provides a gradient transmission method. The gradient transmission method in this aspect corresponds to the gradient transmission method in the third aspect. The gradient transmission method in this aspect is described from a second communication apparatus side. In this method, a second communication apparatus receives a fourth intermediate gradient. The fourth intermediate gradient is determined based on channel information and received training data. The fourth intermediate gradient is used to update a parameter of a first neural network located in the second communication apparatus. The second communication apparatus updates the parameter of the first neural network based on the fourth intermediate gradient.

It may be learned that in this embodiment, the fourth intermediate gradient received by the second communication apparatus over a communication link is determined based on the channel information and the training data, that is, the second communication apparatus obtains the accurate fourth intermediate gradient, so that joint training of the first communication apparatus and the second communication apparatus may be implemented.

According to a fifth aspect, an embodiment described herein provides a gradient transmission method. In this method, a first communication apparatus determines a first intermediate gradient based on received training data. The first intermediate gradient is used to update a parameter of a first neural network located in a second communication apparatus. The first communication apparatus sends the first intermediate gradient and control information to the second communication apparatus.

It may be learned that in this embodiment, when sending the first intermediate gradient, the first communication apparatus also sends the control information, so that the second communication apparatus may perform channel estimation based on the control information, and obtain the accurate fourth intermediate gradient based on the estimated channel information and the first intermediate gradient. This facilitates completing joint training of the first communication apparatus and the second communication apparatus.

According to a sixth aspect, an embodiment described herein provides a gradient transmission method. The gradient transmission method in this aspect corresponds to the gradient transmission method in the fifth aspect. The gradient transmission method in this aspect is described from a second communication apparatus side. In this method, a second communication apparatus receives a first intermediate gradient and control information. The first intermediate gradient is determined based on training data. The first intermediate gradient is used to update a parameter of a first neural network located in the second communication apparatus. The second communication apparatus performs channel estimation based on the control information, to obtain channel information. The second communication apparatus obtains a fifth intermediate gradient based on the first intermediate gradient and the channel information. The second communication apparatus updates the parameter of the first neural network located in the second communication apparatus based on the fifth intermediate gradient.

It may be learned that in this embodiment, the second communication apparatus performs the channel estimation based on the received control information, to obtain the channel information, and determine the fifth intermediate gradient based on the received first intermediate gradient and the channel information, to implement joint training of the first communication apparatus and the second communication apparatus based on the fifth intermediate gradient.

According to a seventh aspect, an embodiment described herein provides a communication apparatus. The communication apparatus has some or all functions of the first communication apparatus for implementing the first aspect, has some or all functions of the second communication apparatus for implementing the second aspect, has some or all functions of the first communication apparatus for implementing the third aspect, has some or all functions of the second communication apparatus for implementing the fourth aspect, has some or all functions of the first communication apparatus for implementing the fifth aspect, or has some or all functions of the second communication apparatus for implementing the sixth aspect. For example, the communication apparatus may have a function of the first communication apparatus in some or all embodiments in the first aspect, or may have a function of independently implementing any embodiment. This function may be implemented by using hardware, or may be implemented by executing corresponding software by hardware. The hardware or the software includes one or more units or modules corresponding to the foregoing functions.

In a possible design, a structure of the communication apparatus includes a processing unit and a communication unit. The processing unit is configured to support the communication apparatus in performing a corresponding function in the foregoing method. The communication unit is configured to support communication between the communication apparatus and another communication apparatus. The communication apparatus may further include a storage unit. The storage unit is coupled to the processing unit and a transceiver unit, and stores program instructions and data that are necessary for the communication apparatus.

In an implementation, the communication apparatus includes:

a communication unit, configured to receive training data; and a processing unit, configured to determine a first intermediate gradient based on the training data, where the first intermediate gradient is used to update a parameter of a first neural network located in a second communication apparatus, where the processing unit is further configured to map the first intermediate gradient to an air interface resource to generate a first gradient signal, where the first gradient signal includes one or more first gradient symbols, and each of the first gradient symbols corresponds to one or more gradient values of the first intermediate gradient; and the communication unit is further configured to send the first gradient signal to the second communication apparatus.

In addition, for another optional implementation of the communication apparatus in this aspect, refer to related content in the first aspect. Details are not described herein again.

In another implementation, the communication apparatus includes:

a communication unit, configured to receive one or more second gradient signals, where the second gradient signal is a signal obtained after a first gradient signal passes through a channel, the first gradient signal is generated by mapping a first intermediate gradient to an air interface resource, the first gradient signal includes one or more first gradient symbols, and each of the first gradient symbols corresponds to one or more gradient values of the first intermediate gradient; and a processing unit, configured to determine a second intermediate gradient based on the one or more second gradient signals, where the processing unit is further configured to update a parameter of a first neural network based on the second intermediate gradient.

In addition, for another optional implementation of the communication apparatus in this aspect, refer to related content in the second aspect. Details are not described herein again.

In still another implementation, the communication apparatus includes:

a processing unit, configured to determine a fourth intermediate gradient based on channel information and received training data, where the fourth intermediate gradient is used to update a parameter of a first neural network located in a second communication apparatus; and a communication unit, configured to send the fourth intermediate gradient over a communication link, where the communication link is different from a communication link between a first communication apparatus and the second communication apparatus.

In still another implementation, the communication apparatus includes:

a communication unit, configured to receive a fourth intermediate gradient, where the fourth intermediate gradient is determined based on channel information and received training data, and the fourth intermediate gradient is used to update a parameter of a first neural network located in a second communication apparatus; and a processing unit, configured to update the parameter of the first neural network based on the fourth intermediate gradient.

In still another implementation, the communication apparatus includes:

a processing unit, configured to determine a first intermediate gradient based on received training data, where the first intermediate gradient is used to update a parameter of a first neural network located in a second communication apparatus; and a communication unit, configured to send the first intermediate gradient and control information to the second communication apparatus.

In still another implementation, the communication apparatus includes:

a communication unit, configured to receive a first intermediate gradient and control information, where the first intermediate gradient is determined based on training data, and the first intermediate gradient is used to update a parameter of a first neural network located in a second communication apparatus; and a processing unit, configured to perform channel estimation based on the control information, to obtain channel information, where the processing unit is further configured to obtain a fifth intermediate gradient based on the first intermediate gradient and the channel information; and the processing unit is further configured to update the parameter of the first neural network located in the second communication apparatus based on the fifth intermediate gradient.

For example, the transceiver unit may be a transceiver or a communication interface, the storage unit may be a memory, and the processing unit may be a processor.

In an implementation, the communication apparatus includes:

a communication interface, configured to receive training data; and a processor, configured to determine a first intermediate gradient based on the training data, where the first intermediate gradient is used to update a parameter of a first neural network located in a second communication apparatus, where the processor is further configured to map the first intermediate gradient to an air interface resource to generate a first gradient signal, where the first gradient signal includes one or more first gradient symbols, and each of the first gradient symbols corresponds to one or more gradient values of the first intermediate gradient; and the communication interface is further configured to send the first gradient signal to the second communication apparatus.

In addition, for another optional implementation of the communication apparatus in this aspect, refer to related content in the first aspect. Details are not described herein again.

In another implementation, the communication apparatus includes:

a communication interface, configured to receive one or more second gradient signals, where the second gradient signal is a signal obtained after a first gradient signal passes through a channel, the first gradient signal is generated by mapping a first intermediate gradient to an air interface resource, the first gradient signal includes one or more first gradient symbols, and each of the first gradient symbol corresponds to one or more gradient values of the first intermediate gradient; and a processor, configured to determine a second intermediate gradient based on the one or more second gradient signals, where the processor is further configured to update a parameter of a first neural network based on the second intermediate gradient.

In addition, for another optional implementation of the communication apparatus in this aspect, refer to related content in the second aspect. Details are not described herein again.

In still another implementation, the communication apparatus includes:

a processor, configured to determine a fourth intermediate gradient based on channel information and received training data, where the fourth intermediate gradient is used to update a parameter of a first neural network located in a second communication apparatus; and a communication interface, configured to send the fourth intermediate gradient over a communication link, where the communication link is different from a communication link between a first communication apparatus and the second communication apparatus.

In still another implementation, the communication apparatus includes:

a communication interface, configured to receive a fourth intermediate gradient, where the fourth intermediate gradient is determined based on channel information and received training data, and the fourth intermediate gradient is used to update a parameter of a first neural network located in a second communication apparatus; and a processor, configured to update the parameter of the first neural network based on the fourth intermediate gradient.

In still another implementation, the communication apparatus includes:

a processor, configured to determine a first intermediate gradient based on received training data, where the first intermediate gradient is used to update a parameter of a first neural network located in a second communication apparatus; and a communication interface, configured to send the first intermediate gradient and control information to the second communication apparatus.

In still another implementation, the communication apparatus includes:

a communication interface, configured to receive a first intermediate gradient and control information, where the first intermediate gradient is determined based on training data, and the first intermediate gradient is used to update a parameter of a first neural network located in a second communication apparatus; and a processor, configured to perform channel estimation based on the control information, to obtain channel information, where the processor is further configured to obtain a fifth intermediate gradient based on the first intermediate gradient and the channel information; and the processor is further configured to update the parameter of the first neural network located in the second communication apparatus based on the fifth intermediate gradient.

In another implementation, the communication apparatus is a chip or a chip system. The processing unit may alternatively be embodied as a processing circuit or a logic circuit. The transceiver unit may be an input/output interface, an interface circuit, an output circuit, an input circuit, a pin, a related circuit, or the like on the chip or the chip system.

In an implementation process, the processor may be configured to perform, for example, but not limited to, baseband related processing, and the transceiver may be configured to perform, for example, but not limited to, radio frequency transmission and reception. The foregoing components may be separately disposed on chips that are independent of each other, or may be at least partially or completely disposed on a same chip. For example, the processor may be further divided into an analog baseband processor and a digital baseband processor. The analog baseband processor and the transceiver may be integrated on a same chip, and the digital baseband processor may be disposed on an independent chip. With the development of integrated circuit technologies, more and more components can be integrated on a same chip. For example, the digital baseband processor and a plurality of types of application processors (for example, but not limited to, a graphics processor and a multimedia processor) may be integrated on a same chip. The chip may be referred to as a system on a chip (SoC). Whether the components are separately disposed on different chips or integrated and disposed on one or more chips often depends on a requirement of a product design. An implementation form of the components is not limited in the embodiments.

According to an eighth aspect, an embodiment described herein provides a processor, configured to perform the foregoing methods. In a process of performing these methods, a process of sending the foregoing information and a process of receiving the foregoing information in the methods may be understood as a process of outputting the foregoing information by the processor and a process of receiving the foregoing inputted information by the processor. When outputting the foregoing information, the processor outputs the foregoing information to a transceiver, so that the transceiver transmits the information. After the foregoing information is output by the processor, other processing may further need to be performed on the information before the information reaches the transceiver. Similarly, when the processor receives the foregoing inputted information, the transceiver receives the foregoing information, and inputs the information into the processor. Further, after the transceiver receives the foregoing information, other processing may need to be performed on the information before the information is inputted into the processor.

Based on the foregoing principle, for example, sending of the first gradient signal in the foregoing methods may be understood as outputting of the first gradient signal by the processor.

Unless otherwise specified, or if operations such as transmitting, sending, and receiving related to the processor do not contradict an actual function or internal logic of the operations in related descriptions, all the operations may be more generally understood as operations such as outputting, receiving, and inputting of the processor, instead of operations such as transmitting, sending, and receiving directly performed by a radio frequency circuit and an antenna.

In an implementation process, the processor may be a processor specifically configured to perform these methods, or may be a processor, for example, such as a general-purpose processor, that executes computer instructions in a memory to perform these methods. The memory may be a non-transitory memory, for example, a read-only memory (ROM). The memory and the processor may be integrated on a same chip, or may be separately disposed on different chips. A type of the memory and a manner of disposing the memory and the processor are not limited in the embodiments.

According to a ninth aspect, an embodiment described herein provides a communication system. The system includes at least one first communication apparatus and at least one second communication apparatus in the foregoing aspects. In another possible design, the system may further include another device that interacts with the first communication apparatus and the second communication apparatus in the solutions provided in at least one embodiment.

According to a tenth aspect, an embodiment described herein provides a computer-readable storage medium, configured to store instructions. When the instructions are executed by a communication apparatus, the method according to any one of the first aspect to the sixth aspect is implemented.

According to an eleventh aspect, an embodiment described herein provides a computer program product including instructions. When the computer program product runs on a communication apparatus, the communication apparatus is enabled to perform the method according to any one of the first aspect to the sixth aspect.

According to a twelfth aspect, an embodiment described herein provides a chip system. The chip system includes a processor and an interface. The interface is configured to obtain a program or instructions. The processor is configured to invoke the program or the instructions to implement or support a first communication apparatus in implementing a function in the first aspect, is configured to invoke the program or the instructions to implement or support a second communication apparatus in implementing a function in the second aspect, is configured to invoke the program or the instructions to implement or support the first communication apparatus in implementing a function in the third aspect, configured to invoke the program or the instructions to implement or support the second communication apparatus in implementing a function in the fourth aspect, configured to invoke the program or the instructions to implement or support the first communication apparatus in implementing a function in the fifth aspect, or is configured to invoke the program or the instructions to implement or support the second communication apparatus in implementing a function in the sixth aspect, for example, by determining or processing at least one of the data and the information in the foregoing methods. In a possible design, the chip system further includes a memory. The memory is configured to store program instructions and data that are necessary for a terminal. The chip system may include a chip, or may include the chip and another discrete component.

DESCRIPTION OF EMBODIMENTS

The following clearly describes technical solutions in at least one embodiment with reference to the accompanying drawings in at least one embodiment.

First, to better understand a gradient transmission method disclosed in at least one embodiment, a communication system applicable to at least one embodiment is described.

Figure 1:
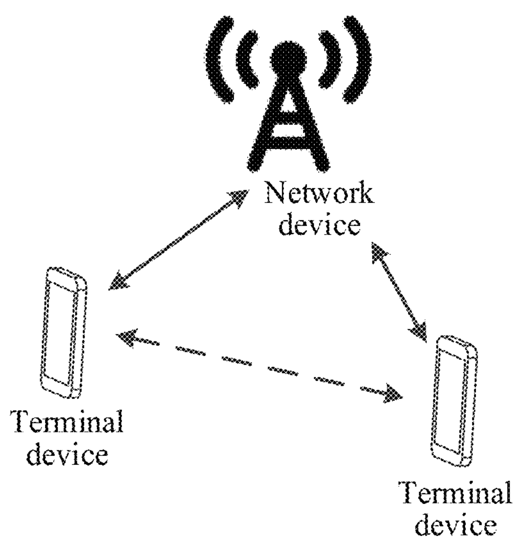
FIG. 1 is a schematic diagram of a structure of a communication system according to at least one embodiment.

FIG. 1 is a schematic diagram of a structure of a communication system according to at least one embodiment. The communication system may include but is not limited to one network device and two terminal devices. Quantities and forms of the devices shown in FIG. 1 are used as an example, and do not constitute a limitation on the at least one embodiment. During actual application, two or more network devices and more than two terminal devices may be included. The communication system shown in FIG. 1 is described by using an example in which one network device and two terminal devices are used, and the network device can serve the terminal devices.

The technical solutions in at least one embodiment may be applied to a wireless communication system such as a 5th generation mobile communication (5G), satellite communication, and short-range communication. The wireless communication system in at least one embodiment includes but is not limited to enhanced mobile broadband (eMBB) in three application scenarios of a narrowband internet of things (NB-IoT, NB-IoT) system, a long term evolution (LTE), and a 5G communication system, ultra-reliable low-latency communication (URLLC), and massive machine-type communications (mMTC), and with the continuous development of communication technologies, further includes a communication system that is subsequently evolved, for example, a 6th generation mobile communication system (6G).

The wireless communication system in at least one embodiment may include cells, each cell includes one base station (BS), and the base station may provide a communication service for a plurality of mobile stations (MSs). The wireless communication system may further perform point-to-point communication, for example, a plurality of terminal devices that communicate with each other.

In at least one embodiment, a network device is an apparatus deployed in a radio access network to provide a wireless communication function for a terminal. The network device may include various forms of macro base stations, micro base stations (also referred to as small cells), relay stations, access points, and the like. In systems that use different radio access technologies, names of devices having functions of the base station may vary. For example, the device is referred to as an evolved NodeB (eNB or eNodeB) in an LTE system or a next generation NodeB in a 5G new radio (NR) system, or may include a central unit (CU) and a distributed unit (DU) in a cloud radio access network (Cloud RAN) system. The device further includes a device that functions as a base station in device-to-device (D2D) communication, vehicle-to-everything (V2X) communication, machine-to-machine (M2M) communication, and internet of things communication, for example, a road side unit (RSU) in a V2X technology. For ease of description, in all embodiments, all apparatuses that provide a wireless communication function for a terminal are referred to as network devices or BSs.

In embodiments described herein, the terminal may include various handheld devices, vehicle-mounted devices, wearable devices, or computing devices that have a wireless communication function, or other processing devices connected to a wireless modem. The terminal may also be referred to as a terminal device, or may be a subscriber unit, a cellular phone, a smartphone, a wireless data card, a personal digital assistant (PDA) computer, a tablet computer, a wireless modem, a handset, a laptop computer, a machine type communication (MTC) terminal, a device-to-device (D2D) terminal device, a vehicle-to-everything (V2X) terminal device, a machine-to-machine (M2M) terminal device, an internet of things (IoT) terminal device, a virtual reality (VR) terminal device, an augmented reality (AR) terminal device, a terminal in industrial control, a terminal in self driving, a terminal in remote medical, a terminal in a smart grid, a terminal in transportation safety, a terminal in a smart city, a terminal in a smart home, or the like. The terminal further includes devices such as a satellite, an aircraft, a drone, and a balloon.

To facilitate understanding of at least one embodiment, the following two points are described.

(1) In at least one embodiment, a scenario of a 5G NR network in a wireless communication network is used as an example for description. It should be noted that the solutions in at least one embodiment may be further applied to another wireless communication network. A corresponding name may also be replaced with a name of a corresponding function in the another wireless communication network.

(2) At least one embodiment will present various aspects, embodiments, or features based on a system including a plurality of devices, components, modules, and the like. It should be appreciated and understood that each system may include another device, component, module, and the like, and/or may not include all devices, components, modules, and the like discussed with reference to the accompanying drawings. In addition, a combination of these solutions may be used.

Second, related concepts in at least one embodiment are briefly described.

1. Markov Decision Process (MDP).

Figure 2:
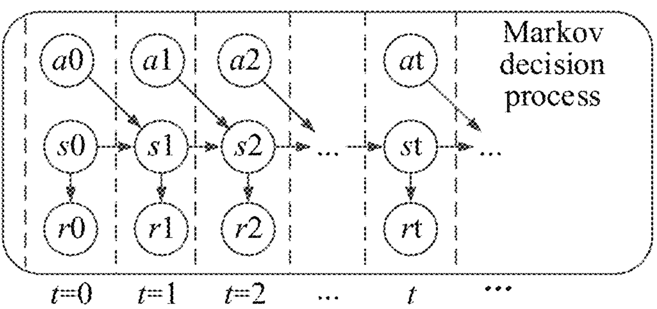
FIG. 2 is a schematic diagram of a Markov decision process according to at least one embodiment.

The Markov decision process is a mathematical model for analyzing a decision problem. The MDP is shown in FIG. 2. In FIG. 2, s represents a current environment state, a represents a decision, and r represents a reward. If the environment has a Markov property, a conditional probability distribution of a future state of the environment depends only on the current environment state. It may be learned from FIG. 2 that a decision maker may make the decision a based on the current environment state s, and obtain a new state and the reward r after interacting with the environment.

2. Reinforcement Learning.

Figure 3:
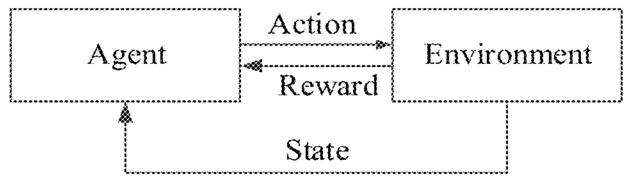
FIG. 3 is a schematic diagram of reinforcement learning according to at least one embodiment.

Reinforcement learning is a learning mode in which an agent learns by interacting with the environment. Reinforcement learning is generated after a problem is modeled as the foregoing MDP problem. A process of the reinforcement learning is shown in FIG. 3. The agent performs an action on the environment based on a state fed back by the environment, to obtain a reward and a state at a next moment. A goal of reinforcement learning is to maximize rewards accumulated by the agent within a period of time.

In the reinforcement learning, a reinforcement signal provided by the environment evaluates the quality of the generated action, rather than telling a reinforcement learning system how to generate a correct action. Because the external environment provides little information, the agent needs to learn from its own experiences. In this learning manner, the agent can obtain knowledge in an action-evaluation environment, to improve an action plan to adapt to the environment.

Common reinforcement learning algorithms include Q-learning, policy gradient, actor-critic, and the like. Currently, a commonly used reinforcement learning algorithm is usually deep reinforcement learning (DRL), which mainly combines the reinforcement learning with deep learning, and uses a neural network to model a policy/value function, to adapt to a dimension of a larger input/output.

3. Supervised Learning.

Supervised learning is a widely used learning style. In supervised learning, a training set (including a plurality of pairs of input data and labels) is given, a mapping relationship between the input (data) and the output (labels) is learned, and the mapping relationship is expected to be applied to data outside the training set. The training set is a set of correct input and output pairs.

4. Fully Connected Neural Network and Training of the Neural Network.

Figure 4:
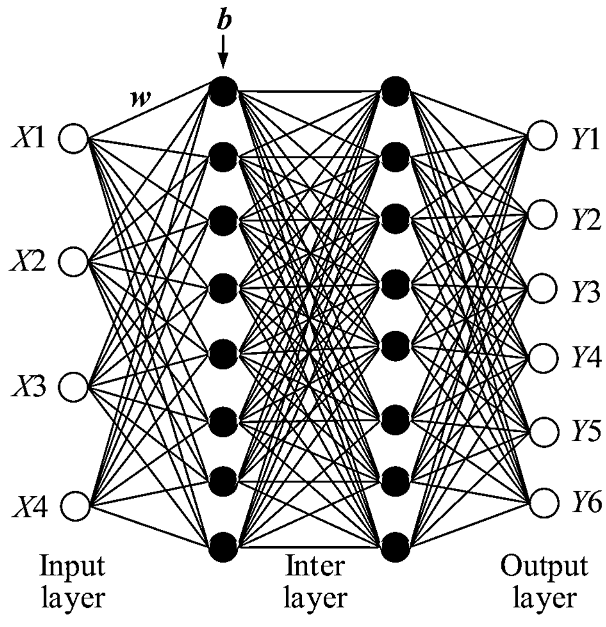
FIG. 4 is a schematic diagram of a structure of a fully connected neural network according to at least one embodiment.

The fully connected neural network is also referred to as a multilayer perceptron (MLP). As shown in FIG. 4, an MLP includes an input layer, an output layer, and a plurality of hidden layers, and each layer includes a plurality of nodes. The node is referred to as a neuron. Neurons of two adjacent layers are connected to each other.

For the neurons of the two adjacent layers, an output h of the neurons of the lower layer is obtained by using an activation function on a weighted sum of all the neurons x that are of the upper layer and that are connected to the neurons of the lower layer. h may be expressed by using a matrix as:

$$h=f(wx+b) \tag{1},$$

where w is a weight matrix, b is a bias vector, and f is the activation function. An output of the neural network may be recursively expressed as:

$$y=f_n(w_n f_{n-1}(\ldots)+b_n) \tag{2}.$$

That is, the neural network may be understood as a mapping relationship from an input data set to an output data set.

Figure 5:
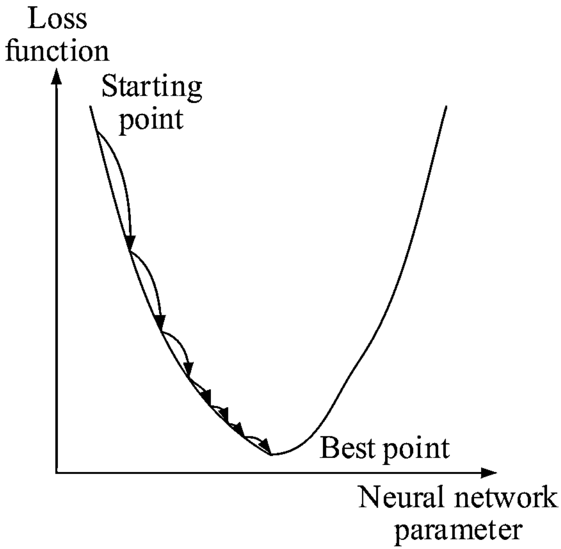
FIG. 5 is a schematic diagram of a training mode of a neural network according to at least one embodiment.

The training of the neural network refers to a process of obtaining the mapping relationship from random w and b by using existing data. As shown in FIG. 5, a specific manner of training the neural network is evaluating an output result of the neural network by using a loss function, performing reverse transmission of an error, and iteratively optimizing w and b by using a gradient descent method until the loss function reaches a minimum value.

A process of the gradient descent may be expressed as:

$$\theta-\eta\frac{\partial L}{\partial\theta}\rightarrow\theta, \tag{3}$$

where θ is a to-be-optimized parameter, for example, w and b, L is the loss function, and η is learning efficiency and is used to control a step size of the gradient descent.

Figure 6:
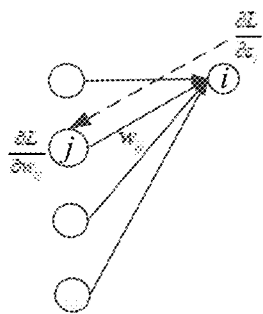
FIG. 6 is a schematic diagram of reverse transmission of a gradient according to at least one embodiment.

A chain rule for computing a partial derivative is used in a process of the reverse transmission. To be specific, a gradient of a previous layer parameter may be recursively calculated by using a gradient of a next layer parameter. As shown in FIG. 6, a gradient of a weight $w_{ij}$ between a neuron j and a neuron i in FIG. 6 may be expressed as:

$$\frac{\partial L}{\partial w_{ij}}=\frac{\partial L}{\partial s_i}\frac{\partial s_i}{\partial w_{ij}}, \tag{4}$$

where $s_i$ is a weighted sum of inputs on the neuron i. It may be learned from the formula (6) that the gradient of the weight $w_{ij}$ between the neuron j and the neuron i needs to be determined based on a gradient $$\frac{\partial s_i}{\partial w_{ij}}$$

on the neuron i.

5. Intermediate Gradient.

The intermediate gradient is one or more items in a gradient expression of a neural network parameter, or is a product of the plurality of items. When the intermediate gradient is the plurality of items in the gradient expression of the neural network parameter, the plurality of items are separately sent back to a previous communication apparatus.

Figure 7:
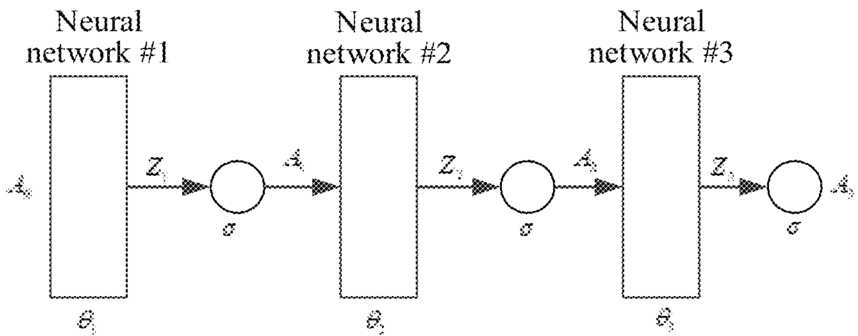
FIG. 7 is a schematic diagram of a structure of a neural network according to at least one embodiment.

For example, a communication system shown in FIG. 7 includes a neural network #1, a neural network #2, and a neural network #3, and parameters corresponding to the neural networks are respectively $\theta_1$, $\theta_2$, and $\theta_3$. $A_0$, $A_1$, and $A_2$ are respectively inputs of the neural network #1, the neural network #2, and the neural network #3, and $\sigma$ is one or more functions for processing data. $Z_i=\theta_i g A_{i-1}$ and $A_{i-1}=\sigma g(Z_{i-1})$, where i may be 1, 2, or 3.

Gradients of the parameters of the neural network #3, the neural network #2, and the neural network #1 are respectively:

$$\frac{\partial l}{\partial \theta_3} = \frac{\partial l}{\partial A_3}\frac{\partial A_3}{\partial Z_3}\frac{\partial Z_3}{\partial \theta_3}, \tag{5}$$

$$\frac{\partial l}{\partial \theta_2} = \frac{\partial l}{\partial A_3}\frac{\partial A_3}{\partial Z_3}\frac{\partial Z_3}{\partial A_2}\frac{\partial A_2}{\partial Z_2}\frac{\partial Z_2}{\partial \theta_2}, \text{ and} \tag{6}$$

$$\frac{\partial l}{\partial \theta_1} = \frac{\partial l}{\partial A_3}\frac{\partial A_3}{\partial Z_3}\frac{\partial Z_3}{\partial A_2}\frac{\partial A_2}{\partial Z_2}\frac{\partial Z_2}{\partial A_1}\frac{\partial A_1}{\partial Z_1}\frac{\partial Z_1}{\partial \theta_1}, \tag{7}$$

where l is a loss function. Therefore, the intermediate gradient of the parameter of the neural network #3 is one or more items in the formula (5), or a product of the plurality of items. For example, the intermediate gradient of the parameter of the neural network #3 is $$\frac{\partial l}{\partial A_3}\frac{\partial A_3}{\partial Z_3}.$$

For another example, the intermediate gradient of the parameter of the neural network #3 is $$\frac{\partial l}{\partial A_3} \text{ and } \frac{\partial A_3}{\partial Z_3}.$$

The intermediate gradient of the parameter of the neural network #2 is one or more items in formula (6), or a product of the plurality of items. For example, the intermediate gradient of the parameter of the neural network #2 is $$\frac{\partial l}{\partial A_3}\frac{\partial A_3}{\partial Z_3}\frac{\partial Z_3}{\partial A_2}.$$

For another example, the intermediate gradient of the parameter of the neural network #2 is $$\frac{\partial l}{\partial A_3}\frac{\partial A_3}{\partial Z_3}\frac{\partial Z_3}{\partial A_2}\frac{\partial A_2}{\partial Z_2}.$$

For still another example, the intermediate gradient of the parameter of the neural network #2 is $$\frac{\partial l}{\partial A_3}\frac{\partial A_3}{\partial Z_3}.$$

The intermediate gradient of the parameter of the neural network #1 is one or more items in formula (7), or a product of the plurality of items. For example, the intermediate gradient of the parameter of the neural network #1 is $$\frac{\partial l}{\partial A_3}\frac{\partial A_3}{\partial Z_3}\frac{\partial Z_3}{\partial A_2}\frac{\partial A_2}{\partial Z_2}\frac{\partial Z_2}{\partial A_1}.$$

For another example, the intermediate gradient of the parameter of the neural network #1 is $$\frac{\partial l}{\partial A_3}\frac{\partial A_3}{\partial Z_3}\frac{\partial Z_3}{\partial A_2}\frac{\partial A_2}{\partial Z_2}\frac{\partial Z_2}{\partial A_1}\frac{\partial A_1}{\partial Z_1}.$$

6. Autoencoder (DAE).

Figure 8:
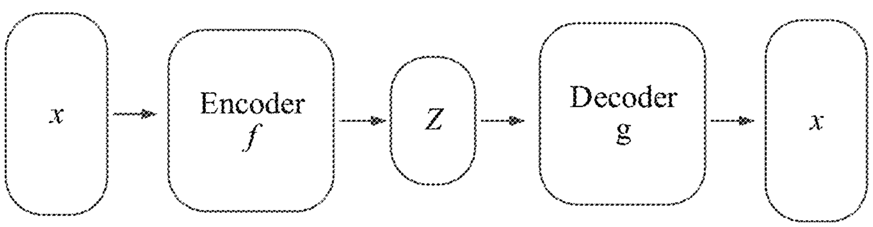
FIG. 8 is a schematic diagram of a structure of an autoencoder according to at least one embodiment.

The autoencoder is a common artificial intelligence (AI) technology in the field of computer science, and is one type of unsupervised learning. A diagram of a structure of the autoencoder is shown in FIG. 8. The autoencoder maps/compresses input data x to a variable in latent space by using a function $f$, and restores original data from a variable z in latent space by using a function g, where the function $f$ and the function g may be implemented by using a neural network. An optimization goal of the autoencoder is to search for parameters of the function $f$ and the function g, to minimize an error of the restored data. In terms of a task performed by the autoencoder, the autoencoder may alternatively be considered as a label-known supervised learning process.

A task completed by the communication system may usually be similar to that of the foregoing autoencoder. In other words, the communication system may be compared with the autoencoder implemented in a distributed manner. For the communication system, it may be considered that a transmit end sends a variable in latent space (waveform) through a channel, and a receive end restores information about the variable in the latent space. A communication system shown in FIG. 9 includes a second communication apparatus, a first communication apparatus, and a channel. The second communication apparatus and the first communication apparatus include a neural network (neural network+conventional signal processing module), X is an input of the channel, Y is an output of the channel, $\theta$ is a parameter of a neural network located in the second communication apparatus, and $\omega$ is a parameter of a neural network located in the first communication apparatus. A process in which the second communication apparatus sends data and the first communication apparatus receives and restores the data is referred to as a forward inference process of the neural network, that is, a communication process of the communication system. Before the communication system is used, the parameter of the neural network needs to be trained. A training process of the neural network includes forward inference of training data, calculation of a loss function, and reverse transmission of a gradient. However, when a channel transfer function is unknown, the reverse transmission of the gradient is hindered. Specifically, when the second communication apparatus updates a transmitter parameter, a last-layer neural network of the second communication apparatus needs to receive a gradient sent back by a first-layer neural network of the first communication apparatus. However, the second communication apparatus cannot obtain an accurate gradient sent back by the first communication apparatus due to the unknown channel transfer function. Consequently, joint training of the first communication apparatus and the second communication apparatus cannot be completed.

Figure 9:
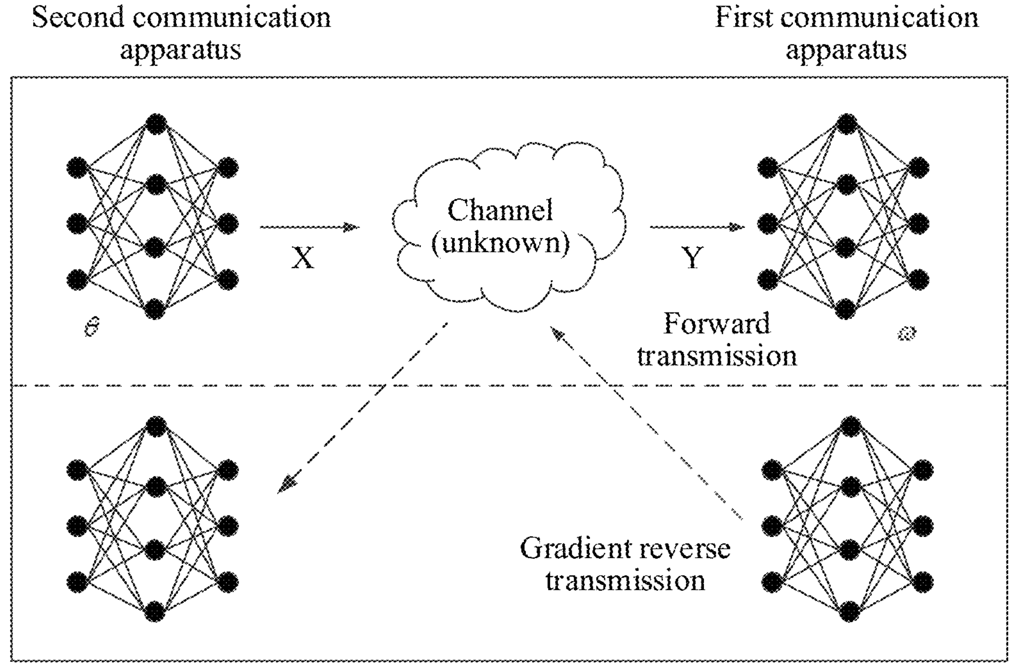
FIG. 9 is a schematic diagram of a structure of another communication system according to at least one embodiment.

Currently, for the communication system shown in FIG. 9, mathematical modeling may be performed on the channel, and offline simulation is performed on training from the second communication apparatus to the first communication apparatus. During actual deployment, an online update is performed on only the parameter of the neural network located in the first communication apparatus, and no update is performed on the parameter of the neural network located in the second communication apparatus. This manner avoids an obstacle that the gradient cannot be reversely transmitted. However, because the second communication apparatus is not trained based on a real channel after actual deployment, a performance loss of the communication system is caused due to a mismatch between the real channel and the channel model.

Alternatively, for the communication system shown in FIG. 9, channel distribution is modeled by using a conditional generative adversarial network (conditional GAN), and the channel is converted into a differentiable neural network/function, so that the gradient can be reversely transmitted to the second communication apparatus. However, training of the GAN is difficult, and reverse transmission of the gradient cannot be implemented. In addition, the joint training of the first communication apparatus and the second communication apparatus cannot be completed either.

Alternatively, for the communication system shown in FIG. 9, the channel is considered to be completely unknown, a gradient estimation method, such as a reinforcement learning algorithm, is used in the second communication apparatus, and a reward fed back by the first communication apparatus is used to update the gradient of the second communication apparatus. In this manner, the first communication apparatus feeds back the reward to the second communication apparatus, and the second communication apparatus still cannot obtain the gradient of the first communication apparatus. Therefore, it is still difficult to complete the joint training of the first communication apparatus and the second communication apparatus.

Channel reciprocity in at least one embodiment means that forward transmission and reverse transmission of information on the channel are the same within a coherence time.

The gradient transmission method in at least one embodiment is also applicable to transmission of other error information, that is, the intermediate gradient may alternatively be the other error information.

At least one embodiment may also be applicable to transmission of other information, and is not limited to only transmission of the gradient. For example, at least one embodiment may also be applied to the transmission of control information. To be specific, the first communication apparatus may map the control information to an air interface resource, and transmit the control information by using an air interface resource.

In at least one embodiment, the first communication apparatus, the second communication apparatus, and a third communication apparatus may be one of a terminal device or a network device. For example, when the communication system includes the first communication apparatus and the second communication apparatus, the first communication apparatus is a terminal device, and the second communication apparatus is a network device. For another example, when the communication system includes the first communication apparatus and the second communication apparatus, both the first communication apparatus and the second communication apparatus are terminal devices. For another example, when the communication system includes the first communication apparatus, the second communication apparatus, and the third communication apparatus that establishes a communication connection to the second communication apparatus, both the first communication apparatus and the second communication apparatus are terminal devices, and the third communication apparatus is a network device.

An embodiment described herein provides a gradient transmission method 100. In the gradient transmission method 100, channels between a first communication apparatus and a second communication apparatus are reciprocal within a coherence time. The first communication apparatus receives training data, and determines a first intermediate gradient based on the training data. The first intermediate gradient is used to update a parameter of a first neural network in the second communication apparatus. Then, the first communication apparatus maps the first intermediate gradient to an air interface resource to generate a first gradient signal, and sends the first gradient signal to the second communication apparatus. The first gradient signal includes one or more first gradient symbols, and each of the first gradient symbols corresponds to one or more gradient values of the first intermediate gradient. In other words, the first communication apparatus maps the first intermediate gradient to the air interface resource for transmission, that is, implements reverse transmission of the first intermediate gradient by sending the first gradient signal to the second communication apparatus, to facilitate the implementation of the joint training of the first communication apparatus and the second communication apparatus.

An embodiment described herein further provides a gradient transmission method 200, which may be applied to a multi-user multiple-input multiple-output communication scenario. In the gradient transmission method 200, any first communication apparatus may perform reverse transmission of a first intermediate gradient to a second communication apparatus in a form of a first gradient signal, so that the second communication apparatus obtains a plurality of accurate first gradient signals. Therefore, the second communication apparatus accurately updates a parameter of a first neural network based on the plurality of first gradient signals, to complete joint training of the first communication apparatus and the second communication apparatus.

In addition, when the communication system shown in FIG. 9 further includes the third communication apparatus that establishes the communication connection to the second communication apparatus, that is, when the second communication apparatus is a relay node, the second communication apparatus may further generate a third intermediate gradient based on a second intermediate gradient, and perform reverse transmission of the third intermediate gradient to the third communication apparatus in a form of the third gradient signal, so that the third communication apparatus may update a parameter of a second neural network located in the third communication apparatus based on the third gradient signal, to complete joint training of the first communication apparatus and the second communication apparatus. For details of this implementation, refer to the following gradient transmission method 300.

In another implementation, before the first communication apparatus determines the first intermediate gradient based on training data, the first communication apparatus may further receive a pilot from the second communication apparatus, and send feedback information for the pilot to the second communication apparatus. In this way, the second communication apparatus may determine, based on the feedback information, the training data sent to the first communication apparatus, to improve reliability of the training data. For details of this implementation, refer to the following gradient transmission method 400.

An embodiment described herein further provides a gradient transmission method 500. The gradient transmission method 500 is applicable to a case in which channels between a first communication apparatus and a second communication apparatus are not reciprocal within a coherence time. In the gradient transmission method 500, the first communication apparatus performs channel estimation on the channels in advance to obtain channel information, then determines a fourth intermediate gradient based on the channel information and training data, and sends the fourth intermediate gradient to the second communication apparatus over a communication link. The fourth intermediate gradient is sent to the second communication apparatus over the communication link. Therefore, the second communication apparatus obtains the accurate fourth intermediate gradient, so that the second communication apparatus may update a parameter of a first neural network based on the fourth intermediate gradient, to complete joint training of the first communication apparatus and the second communication apparatus.

An embodiment described herein further provides a gradient transmission method 600. In this method, channels between a first communication apparatus and a second communication apparatus are also reciprocal within a coherence time. In the gradient transmission method 600, the first communication apparatus determines a first intermediate gradient based on received training data, and sends the first intermediate gradient and control information to the second communication apparatus. Then, the second communication apparatus determines, based on the control information, to perform channel estimation, to obtain channel information, and determines a fifth intermediate gradient based on the channel information and the first intermediate gradient, so that the fifth intermediate gradient is an accurate gradient of the second communication apparatus. Further, the second communication apparatus may accurately update a parameter of a first neural network based on the fifth intermediate gradient, to complete joint training of the first communication apparatus and the second communication apparatus.

Figure 10:
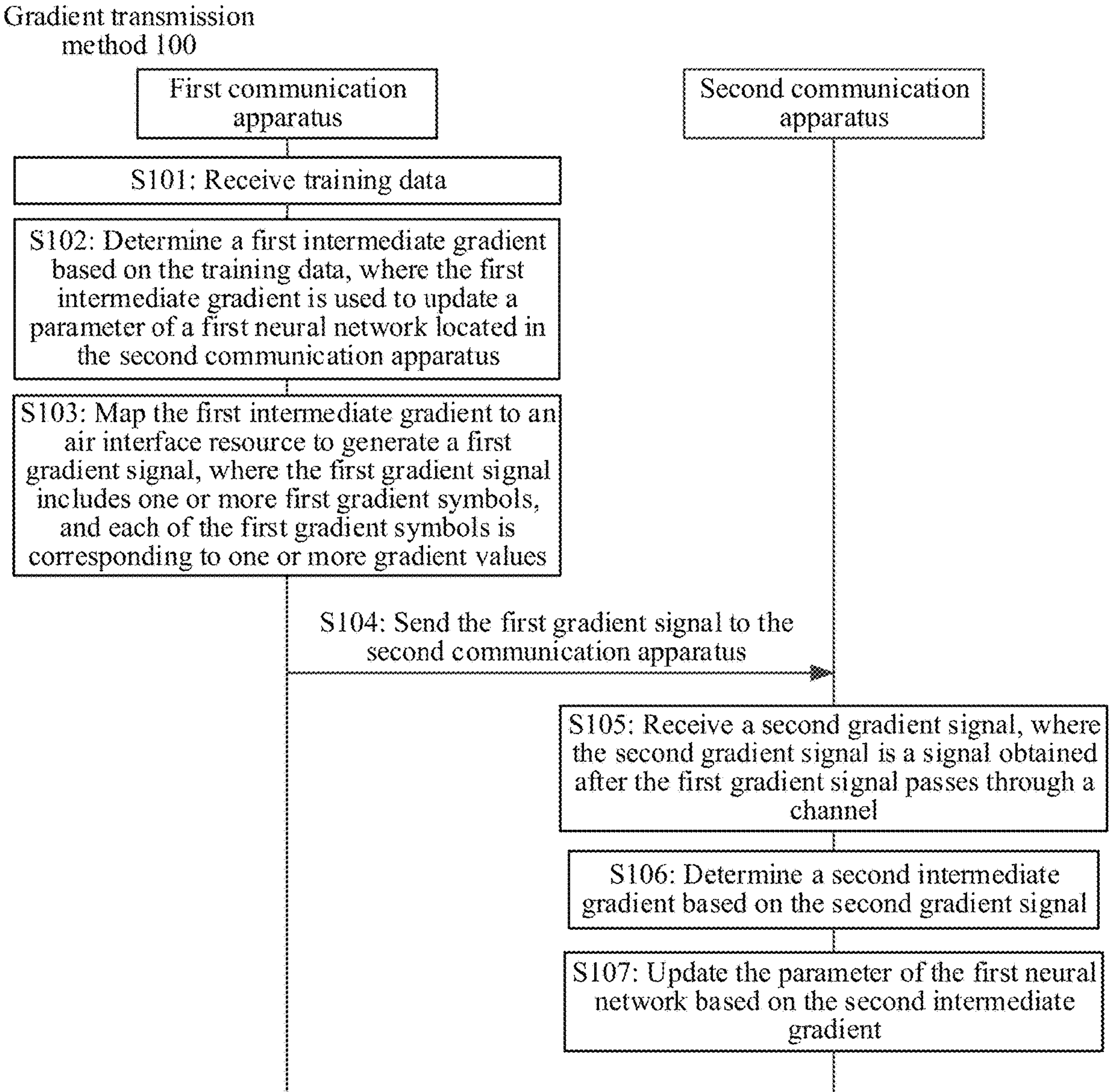
FIG. 10 is a schematic flowchart of a gradient transmission method according to at least one embodiment.

An embodiment described herein provides a gradient transmission method 100. The gradient transmission method is applicable to the communication system shown in FIG. 9, and channels in the communication system are reciprocal within a coherence time. FIG. 10 is a schematic flowchart of the gradient transmission method 100. The gradient transmission method 100 is described from a perspective of interaction between the first communication apparatus and the second communication apparatus. The gradient transmission method 100 includes but is not limited to the following steps.

S101: The first communication apparatus receives training data.

In an optional implementation, the first communication apparatus receives the training data from the second communication apparatus. The training data is data known to the first communication apparatus and the second communication apparatus. The first communication apparatus may update a parameter of a neural network located in the first communication apparatus based on the training data, and the second communication apparatus may also update a parameter of a first neural network located in the second communication apparatus based on the training data.

S102: The first communication apparatus determines a first intermediate gradient based on the training data. The first intermediate gradient is used to update the parameter of the first neural network located in the second communication apparatus.

The first intermediate gradient is a gradient of the first communication apparatus, and the first communication apparatus needs to send back the first intermediate gradient to the second communication apparatus, so that the second communication apparatus may update the parameter of the first neural network located in the second communication apparatus based on the first intermediate gradient.

In an optional implementation, that the first communication apparatus determines a first intermediate gradient based on the training data includes: The first communication apparatus calculates a loss function based on the training data, and determines the first intermediate gradient based on the loss function.

Figure 11:
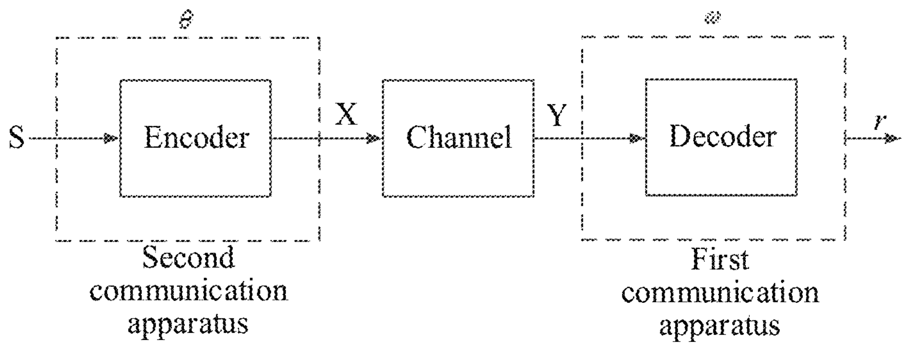
FIG. 11 is a schematic diagram of a structure of a neural network according to at least one embodiment.

FIG. 11 is a neural network structure corresponding to the communication system shown in FIG. 9. In FIG. 11, the training data is data transferred by the second communication apparatus to the first communication apparatus through a channel. After receiving the training data, the first communication apparatus calculates the loss function L based on the training data, and determines, based on the loss function, that the first intermediate gradient is $$\frac{\partial L}{\partial r}\frac{\partial r}{\partial Y},$$

where r is an output of the first communication apparatus, and Y is an input of the first communication apparatus.

S103: The first communication apparatus maps the first intermediate gradient to an air interface resource to generate a first gradient signal. The first gradient signal includes one or more gradient symbols, and each of the gradient symbols corresponds to one or more gradient values.

The air interface resource is one of a time domain resource, a frequency domain resource, or a space domain resource.

In an optional implementation, that the first communication apparatus maps the first intermediate gradient to an air interface resource to generate a first gradient signal includes: converting the gradient values of the first intermediate gradient into one or more first gradient symbols, and mapping the one or more first gradient symbols to the air interface resource to generate the first gradient signal. It may be learned that the first communication apparatus implements reverse transmission of the first intermediate gradient on the air interface resource by mapping the one or more first gradient symbols to the air interface resource.

In this implementation, each of the gradient symbols included in the first gradient signal corresponds to one gradient value of the first intermediate gradient, and the first intermediate gradient exists in a form of the first gradient signal. In other words, the first communication apparatus maps the first intermediate gradient to the air interface resource for transmission, that is, implements reverse transmission of the first intermediate gradient by sending the first gradient signal to the second communication apparatus, to facilitate the completion of the joint training of the first communication apparatus and the second communication apparatus.

S104: The first communication apparatus sends the first gradient signal to the second communication apparatus.

In this embodiment, the first communication apparatus converts the first intermediate gradient into the first gradient signal, instead of performing source coding on the first intermediate gradient at an application layer, then sending the first intermediate gradient back to a physical layer by using a bit stream, performing channel coding and symbol modulation at the physical layer, and generating a signal for sending. The gradient symbols included in the first gradient signal correspond to the gradient values of the first intermediate gradient, so that the first gradient signal is reversely transmitted through a wireless air interface, to implement reverse transmission of the first intermediate gradient. It may be learned that in this implementation, a speed of reverse transmission of the first gradient can be increased, and a speed of updating the first neural network by the second communication apparatus is further increased, that is, a speed of the joint training of the first communication apparatus and the second communication apparatus is increased.

S105: The second communication apparatus receives a second gradient signal. The second gradient signal is a signal obtained after the first gradient signal is transmitted through the channel.

S106: The second communication apparatus determines a second intermediate gradient based on the second gradient signal.

For the neural network shown in FIG. 11, the second communication apparatus determines that the second intermediate gradient is $$\frac{\partial L}{\partial r}\frac{\partial r}{\partial Y}f(H),$$

where a theoretical value of f(H) is $$\frac{\partial Y}{\partial X}.$$

During implementation of this embodiment, a value of f(H) does not need to be explicitly represented.

S107: The second communication apparatus updates the parameter of the first neural network based on the second intermediate gradient.

Correspondingly, for the neural network shown in FIG. 11, that the second communication apparatus updates the parameter of the first neural network based on the second intermediate gradient means an update to the parameter θ based on the second intermediate gradient. The second communication apparatus updates θ by computing a partial derivative of θ by using the second intermediate gradient, that is, updates θ by using $$\frac{\partial L}{\partial r}\frac{\partial r}{\partial Y}f(H)\frac{\partial X}{\partial \theta}.$$

In an optional implementation, the second communication apparatus may use $\gamma\hat{g}$ to update the parameter, where $\hat{g}$ is the second intermediate gradient, and γ is learning efficiency. γ may be preset, may vary with a training process, or may be indicated by the first communication apparatus.

In this embodiment, the first communication apparatus may complete training of the first communication apparatus based on the first intermediate gradient, and the second communication apparatus may complete training of the second communication apparatus based on the received first gradient signal. That is, in this embodiment, joint training of the first communication apparatus and the second communication apparatus may be implemented.

In this embodiment, when the neural network located in the first communication apparatus is a complex neural network, the gradient value of the first intermediate gradient is a complex gradient value. When the neural network located in the first communication apparatus is a real neural network, the gradient value of the first intermediate gradient is a real gradient value. Therefore, that the first communication apparatus converts the gradient values of the first intermediate gradient into one or more first gradient symbols in S103 includes the following several optional implementations.

1. The first intermediate gradient includes p complex gradient values, and the first gradient symbol is a real number symbol.

In an optional implementation, if the communication system including the first communication apparatus and the second communication apparatus transmits a real number symbol, that is, the first gradient symbol is a real number symbol, that the first communication apparatus converts the gradient values of the first intermediate gradient into one or more first gradient symbols includes: converting p complex gradient values included in the first intermediate gradient into 2m first real number symbols, where p is a positive integer, and m is a positive integer less than or equal to p. Therefore, the one or more gradient symbols include the 2m first real number symbols.

It may be learned that when the communication system including the first communication apparatus and the second communication apparatus transmits the real number symbol, and the first intermediate gradient includes the p complex gradient values, the first communication apparatus converts the p complex gradient values into the 2m first real number symbols. In this way, the first communication apparatus maps the 2m first real number symbols to the air interface resource to generate the first gradient signal, so that the first communication apparatus transmits the first intermediate gradient on the air interface resource.

In an optional implementation, that the first communication apparatus converts p complex gradient values included in the first intermediate gradient into 2m first real number symbols includes: The first communication apparatus determines that a real part and an imaginary part of any one of the p complex gradient values included in the first intermediate gradient are one first real number symbol, to obtain the 2m first real number symbols. For example, the first intermediate gradient is $g_i=m_i+jn_i$, where i=0, 1, . . . , p−1. When m is equal to p, the first real number symbol includes $m_i$ and $n_i$.

For example, if the complex gradient values included in the first intermediate gradient are 2+3j, 5+2j, and 8+6j, the first communication apparatus may convert 2+3j and 5+2j into 2, 3, 5, and 2. That is, the first real number symbols include 2, 3, 5, and 2. Therefore, the first communication apparatus maps 2, 3, 5, and 2 to the air interface resource to generate the first gradient signal.

For another example, if the complex gradient values included in the first intermediate gradient are 2+3j, 5+2j, and 8+6j, the first communication apparatus may convert 2+3j and 5+2j into 2, 3, 5, and 2. Then, real parts or imaginary parts of the first gradient symbols are used as the first real number symbols. For example, the first real number symbols include 2 and 5. Therefore, the first communication apparatus maps 2 and 5 to the air interface resource to generate the first gradient signal.

In another optional implementation, the first communication apparatus determines that a real part and an imaginary part of any one of the p complex gradient values included in the first intermediate gradient are one first real number symbol, to obtain 2p first real number symbols, and maps 2m of the 2p first real number symbols to the air interface resource to generate the first gradient signal.

For example, if the complex gradient values included in the first intermediate gradient are 2+3j, 5+2j, and 8+6j, the first communication apparatus may convert 2+3j, 5+2j, and 8+6j into 2, 3, 5, 2, 8, and 6. That is, the first real number symbols include 2, 3, 5, 2, 8, and 6. Then, the first communication apparatus maps 5, 2, 8, and 6 in the first real number symbols to the air interface resource to generate the first gradient signal.

For another example, if the complex gradient values included in the first intermediate gradient are 2+3j, 5+2j, and 8+6j, the first communication apparatus may convert 2+3j, 5+2j, and 8+6j into 2, 3, 5, 2, 8, and 6. Then, real parts or imaginary parts of the first gradient symbols are used as the first real number symbols. For example, the first real number symbols include 3, 2, and 6. Therefore, the first communication apparatus maps 3, 2, and 6 to the air interface resource to generate the first gradient signal.

2. The first intermediate gradient includes p real gradient values, and the first gradient symbol is a real number symbol.

In an optional implementation, if the communication system including the first communication apparatus and the second communication apparatus transmits a real number symbol, that is, the first gradient symbol is a real number symbol, that the first communication apparatus converts the gradient values of the first intermediate gradient into one or more first gradient symbols includes: The first communication apparatus converts p real gradient values included in the first intermediate gradient into m second real number symbols, where p is a positive integer, and m is a positive integer less than or equal to p. Therefore, the one or more gradient symbols include the m second real number symbols.

It may be learned that when the communication system including the first communication apparatus and the second communication apparatus transmits the real number symbol, and the first intermediate gradient includes the p real gradient values, the first communication apparatus converts the p real gradient values into the m second real number symbols. In this way, the first communication apparatus maps the m second real number symbols to the air interface resource to generate the first gradient signal, so that the first communication apparatus transmits the first intermediate gradient on the air interface resource.

In an optional implementation, if m is less than p, that the first communication apparatus converts p real gradient values included in the first intermediate gradient into m second real number symbols includes: The first communication apparatus determines that m of the p real gradient values included in the first intermediate gradient are the m second real number symbols. In this implementation, the p real gradient values do not need to be converted, so that signaling overheads of the first communication apparatus can be reduced.

That is, the first communication apparatus may convert some of the gradient values into the first gradient signal, and perform reverse transmission of the first gradient signal to the second communication apparatus. The converted gradient values may be gradient values whose gradient power or signal-to-noise ratios are greater than a threshold. The remaining unconverted gradient values are not transmitted. In this case, a redundant air interface resource may be used for control signaling transmission, pilot transmission, and the like.

For example, the first intermediate gradient includes 23, 4, 17, 46, 9, and 37. The first communication apparatus maps 23, 17, and 46 to the air interface resource to generate the first gradient signal.

In another optional implementation, if m is equal to p, that the first communication apparatus converts p real gradient values included in the first intermediate gradient into m second real number symbols includes: The first communication apparatus determines that the p real gradient values included in the first intermediate gradient are the p second real number symbols. Optionally, in this case, to prevent convergence of training from being affected by excessively loud noise of the gradient sent back when an actual part of the air interface resource is at deep attenuation, some of the p second real number symbols in the reverse transmission may be set to 0. Specific second real number symbols set to 0 are detected by the first communication apparatus or indicated by the second communication apparatus.

In still another optional implementation, when the first intermediate gradient is a first intermediate gradient obtained after power normalization, the first communication apparatus converts p real gradient values included in the normalized first intermediate gradient into m second real number symbols. In this case, the m second real number symbols are not equal to the m real gradient values included in the first intermediate gradient.

3. The first intermediate gradient includes p complex gradients, and the first gradient symbol is a complex number symbol.

In an optional implementation, if the communication system including the first communication apparatus and the second communication apparatus transmits a complex number symbol, that is, the first gradient symbol is a complex number symbol, that the first communication apparatus converts the gradient values of the first intermediate gradient into one or more first gradient symbols includes: converting p complex gradient values included in the first intermediate gradient into m first complex number symbols, where p is a positive integer, and m is a positive integer less than or equal to p. Therefore, the one or more gradient symbols include the m first complex number symbols.

It may be learned that when the communication system including the first communication apparatus and the second communication apparatus transmits the complex number symbol, and the first intermediate gradient includes the p complex gradient values, the first communication apparatus converts the p complex gradient values into the m first complex number symbols, and maps the m first complex number symbols to the air interface resource to generate the first gradient signal, so that the first communication apparatus may reversely transmit the first intermediate gradient through a wireless air interface.

In an optional implementation, that the first communication apparatus converts p complex gradient values included in the first intermediate gradient into m first complex number symbols includes: The first communication apparatus determines that a real part of any one of the p complex gradient values included in the first intermediate gradient is a real part of one first complex number symbol, and determines that an imaginary part of the complex gradient value is an imaginary part of the first complex number symbol, to obtain the m first complex number symbols. That is, the determined real part of the first complex number symbol corresponds to the real part of the complex gradient value, and the imaginary part of the first complex number symbol corresponds to the imaginary part of the complex gradient value. In this implementation, the first communication apparatus maps conjugates of the m first complex number symbols to the air interface resource to generate the first gradient signal.

For example, the first intermediate gradient includes 2+3j, 5+2j, and 8+6j. The first communication apparatus determines that the second complex number symbols include 5+2j and 8+6j, and maps conjugates of 5+2j and 8+6j: 5-2j and 8-6j, to the air interface resource to generate the first gradient signal. It may be learned that 5-2j included in the first gradient signal corresponds to 5+2j included in the first intermediate gradient, and 8-6j included in the first gradient signal corresponds to 8+6j included in the first intermediate gradient.

In another optional implementation, that the first communication apparatus converts p complex gradient values included in the first intermediate gradient into m first complex number symbols includes: The first communication apparatus determines that an imaginary part of any one of the p complex gradient values included in the first intermediate gradient is a real part of one first complex number symbol, and determines that a real part of the complex gradient value is an imaginary part of the first complex number symbol, to obtain the m first complex number symbols. That is, the determined real part of the first complex number symbol corresponds to the imaginary part of the complex gradient value, and the imaginary part of the first complex number symbol corresponds to the real part of the complex gradient value. In this implementation, the first communication apparatus maps the m first complex number symbols to the air interface resource to generate the first gradient signal.

For example, the first intermediate gradient includes 2+3j, 5+2j, and 8+6j. The first communication apparatus determines, based on 2+3j, 5+2j, and 8+6j, that the second complex number symbols include 3+2j, 2+5j, and 6+8j, and maps 3+2j, 2+5j, and 6+8j to the air interface resource to generate the first gradient signal.

4. The first intermediate gradient includes p real gradients, and the first gradient symbol is a complex number symbol.

In still another optional implementation, if the communication system including the first communication apparatus and the second communication apparatus transmits a complex number symbol, that is, the first gradient symbol is a complex number symbol, that the first communication apparatus converts the gradient values of the first intermediate gradient into one or more first gradient symbols includes: The first communication apparatus converts p real gradient values included in the first intermediate gradient into m second complex number symbols, where p is a positive integer, m is a positive integer less than or equal to $\lceil p/2 \rceil$, and the symbol $\lceil\ \rceil$ indicates rounding up. Therefore, the one or more gradient symbols include the m second complex number symbols.

For example, the first intermediate gradient is $g_i$, where $i=0, 1, \ldots, p-1$. The first real number symbol is $s_k=g_k+g_{k+p}$, where $k=0, 1, \ldots, \lceil p/2 \rceil$.

It may be learned that when the communication system including the first communication apparatus and the second communication apparatus transmits the complex number symbol, and the first intermediate gradient value includes 2p real gradients, the first communication apparatus converts the 2p real gradient values into the m second complex number symbols, and maps the m second complex number symbols to the air interface resource to generate the first gradient signal, so that the first communication apparatus reversely transmits the first intermediate gradient on a wireless air interface resource.

In an optional implementation, that the first communication apparatus converts p real gradient values included in the first intermediate gradient into m second complex number symbols includes: The first communication apparatus determines that any two of the p real gradient values included in the first intermediate gradient are a real part and an imaginary part of one second complex number symbol, to obtain the m second complex number symbols.

In an optional implementation, gradient values corresponding to the second complex number symbols determined by the first communication apparatus do not overlap. For example, the first intermediate gradient includes 23, 4, 17, 46, 9, and 37, and the second complex number symbols determined by the first communication apparatus include 23+4j, 17+46j, and 9+37j. It may be learned that the real part and the imaginary part of each second complex number symbol include non-overlapping real gradients in the real gradients of the first intermediate gradient.

In another optional implementation, gradient values corresponding to the second complex number symbols determined by the first communication apparatus overlap. For example, the first intermediate gradient includes 23, 4, 17, 46, 9, and 37, and the second complex number symbols determined by the first communication apparatus are 23+4j, 4+46j, and 9+46j. That is, the real part and the imaginary part of the second complex number symbols include overlapping real gradients.

In S105, the second intermediate gradient signal is obtained after the first intermediate gradient signal passes through the channel. Therefore, the second intermediate gradient signal corresponds to the first intermediate gradient signal. Therefore, that the second communication apparatus determines a second intermediate gradient based on the second gradient signal in S106 corresponds to the following several implementations.

In an optional implementation, the second gradient signals include 2m third real number symbols, a third real number symbol is a symbol obtained after the first real number symbol passes through the channel, and m is a positive integer. That the second communication apparatus determines the second intermediate gradient based on one or more second gradient signals includes: The second communication apparatus converts the 2m third real number symbols into m complex gradient values of the second intermediate gradient.

That is, the second communication apparatus determines that every two of the 2m third real number symbols are one complex gradient, to obtain the m complex gradients of the second intermediate gradient.

For example, if the second gradient signals include 2, 4, 5, 2, 7, and 6, the second communication apparatus converts 2, 4, 5, 2, 7, and 6 into 2+4j, 5+2j, and 7+6j. That is, the second intermediate gradient includes 2+4j, 5+2j, and 7+6j.

In another optional implementation, the second gradient signals include m fourth real number symbols, the fourth real number symbol is a symbol obtained after the second real number symbol passes through the channel, and m is a positive integer. That the second communication apparatus determines the second intermediate gradient based on one or more second gradient signals includes: The second communication apparatus determines that the m fourth real number symbols are the m real gradient values of the second intermediate gradient. That is, the second communication apparatus directly determines that the m fourth real number symbols are the m real gradient values of the second intermediate gradient.

For example, if the second gradient signals include 23, 4, 17, 46, 9, and 37, the second communication apparatus determines that the second intermediate gradient includes 23, 4, 17, 46, 9, and 37.

In still another optional implementation, the second gradient signals include m third complex number symbols, a third complex number symbol is a symbol obtained after the first complex number symbol passes through the channel, and m is a positive integer. That the second communication apparatus determines the second intermediate gradient based on one or more second gradient signals includes: The second communication apparatus converts the m third complex number symbols into m complex gradient values of the second intermediate gradient.

In an optional implementation, that the second communication apparatus converts the m third complex number symbols into m complex gradient values of the second intermediate gradient includes: The second communication apparatus obtains conjugates of the m third complex number symbols, then determines that a real part of the conjugate of any third complex number symbol is a real part of one complex gradient, and determines that an imaginary part of the conjugate is an imaginary part of the complex gradient, to obtain the m complex gradient values of the second intermediate gradient.

For example, if the third complex number symbols included in the second gradient signal are 2-3j, 5-2j, and 8-6j, the second communication apparatus determines that the conjugates of the third complex number symbols are 2+3j, 5+2j, and 8+6j. Therefore, 2+3j, 5+2j, and 8+6j are determined as three complex gradient values of the second intermediate gradient.

In another optional implementation, that the second communication apparatus converts the m third complex number symbols into m complex gradient values of the second intermediate gradient includes: The second communication apparatus determines that a real part of any one of the m third complex number symbols is an imaginary part of one complex gradient value, and determines that an imaginary part of the third complex number symbol is a real part of the complex gradient value, to obtain the m complex gradient values of the second intermediate gradient.

For example, if the third complex number symbols included in the second gradient signal are 2-3j, 5-2j, and 8-6j, the second communication apparatus determines that 2-3j, 5-2j, and 8-6j are three complex gradients of the second intermediate gradient.

In still another optional implementation, the second gradient signals include m fourth complex number symbols, a fourth complex number symbol is a symbol obtained after the second complex number symbol passes through the channel, and m is a positive integer. That the second communication apparatus determines the second intermediate gradient based on one or more second gradient signals includes: The second communication apparatus converts the m fourth complex number symbols into 2m real gradient values of the second intermediate gradient.

The second communication apparatus determines that a real part and an imaginary part of any one of the m complex number symbols are two real gradient values, to obtain the 2m real gradient values of the second intermediate gradient.

In this embodiment, a conversion relationship between the first intermediate gradient and the first gradient signal is pre-agreed by the first communication apparatus and the second communication apparatus, or is defined in a standard.

In this embodiment, the channel between the first communication apparatus and the second communication apparatus is used as an intermediate layer of a neural network, and a complete neural network includes the neural network located in the first communication apparatus and the neural network located in the second communication apparatus. That is, in this embodiment, the channel is considered to be unknown.

It may be learned that in this embodiment, the first communication apparatus maps the first intermediate gradient to the air interface resource to generate the first gradient signal, and sends the first gradient signal to the second communication apparatus, to implement reverse transmission of the first intermediate gradient on the air interface resource when the channel is unknown. The accuracy of sending back the first intermediate gradient can be improved, so that the second communication apparatus may determine the second intermediate gradient based on the first intermediate gradient, and update the parameter of the first neural network located in the second communication apparatus based on the second intermediate gradient, to improve the accuracy of updating the parameter of the first neural network, and further complete joint training of the first communication apparatus and the second communication apparatus.

In this embodiment, the first intermediate gradient mapped to the air interface resource is the first intermediate gradient obtained after the power normalization. In other words, after performing the power normalization on the first intermediate gradient, the first communication apparatus maps the first intermediate gradient obtained after the power normalization to the air interface resource to generate the first gradient signal.

In an optional implementation, that the first communication apparatus performs the power normalization on the first intermediate gradient includes: performing normalization processing on an average power of all gradient symbols included in the first intermediate gradient. For example, the first intermediate gradient is s*, and the normalization processing is performed on all gradient symbols included in s*:

$$s^{*\prime} = \sqrt{\frac{P}{avg(\|s\|^2)}}\, s^*,$$

where P is the transmit power on each air interface resource, and avg($\|s^*\|^2$) indicates that the power of all the gradient symbols is averaged. That is, the average power of all the gradient symbols is normalized to the transmit power P.

In another optional implementation, that the first communication apparatus performs the power normalization on the first intermediate gradient includes: performing normalization processing on the largest power of all gradient symbols included in the first intermediate gradient. For example, the first intermediate gradient is s*, and the normalization processing is performed on all gradient symbols included in s*:

$$s^{*\prime} = \sqrt{\frac{P}{\max(\|s^*\|^2)}}\, s^*,$$

where P is transmit power on each air interface resource, and max($\|s^*\|^2$) indicates that a largest value of the power of all the gradient symbols is calculated. That is, the largest power of all the gradient symbols is normalized to the transmit power P.

In addition, in this embodiment, the first communication apparatus may further perform amplitude limiting on the first gradient signal, to ensure that a peak-to-average ratio of the first gradient signal meets a system requirement. That is, the first communication apparatus limits an amplitude of the first gradient signal to a preset range, to limit the peak-to-average ratio of the first gradient signal.

In this embodiment, the second communication apparatus receives the first gradient signal, and further includes performing signal processing such as filtering and estimation on the first gradient signal, to eliminate the impact caused by noise interference or a synchronization mismatch on the gradient symbols included in the first gradient signal. This ensures that the correct second intermediate gradient is obtained.

Figure 12:
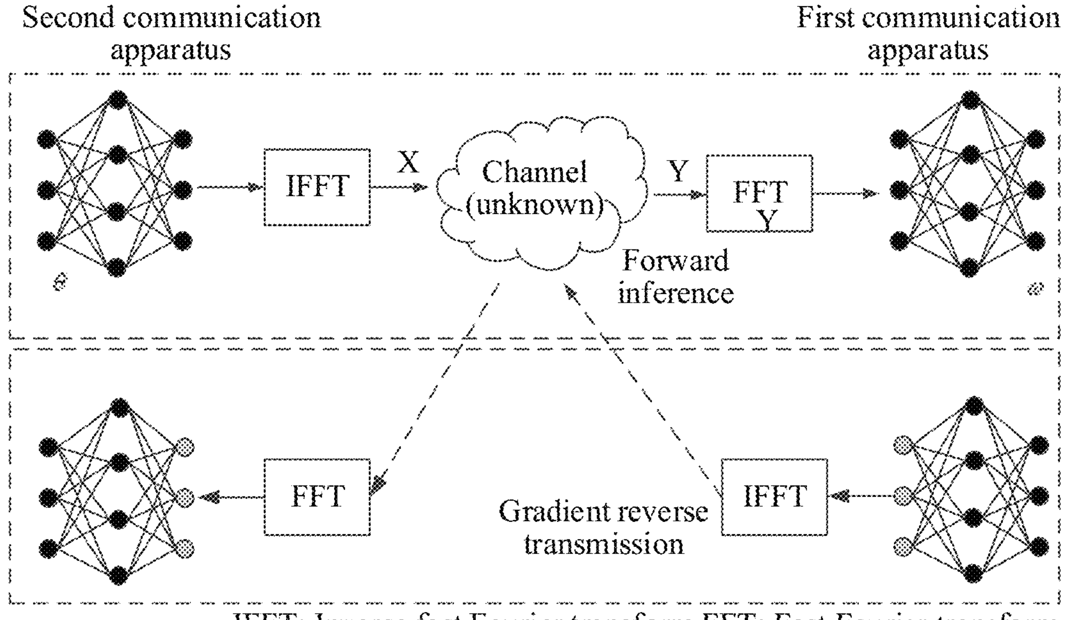
FIG. 12 is a schematic diagram of a structure of still another communication system according to at least one embodiment.

The gradient transmission method 100 may be used in an orthogonal frequency division multiplexing (OFDM) communication system shown in FIG. 12. As shown in FIG. 12, the communication system includes inverse fast Fourier transform (IFFT) and fast Fourier transform (FFT) for data. Optionally, the IFFT module and the FFT module may be replaced with other data processing modules. Alternatively, before and/or after processing by the IFFT module and/or the FFT module, the communication system further includes another processing module, and the processing module is configured to process the data.

Optionally, this embodiment may be further applied to a single-carrier communication scenario, and communication scenarios such as discrete Fourier transform extended orthogonal frequency division multiplexing (discrete Fourier transform extended OFDM, DFT-s-OFDM), single carrier orthogonal frequency division multiplexing (single carrier OFDM, SC-OFDM), and orthogonal time-frequency space (OTFS).

When this embodiment is applied to the OFDM communication system, a propagation model of the system is Y=HX+n, where Y is an output of the communication system, X is an input of the communication system, H is the channel information, and n is the noise. In this case, the first communication apparatus may map the first intermediate gradient to a subcarrier to generate the first gradient signal.

When this embodiment is applied to the single-carrier communication scenario, a propagation model of the system is Y=H*X+n, where * indicates a convolution operation. In this case, the first communication apparatus may map the first intermediate gradient to a slot to generate the first gradient signal.

In this embodiment, an output of the neural network may be the same as or different from a dimension of the first intermediate gradient (namely, a quantity of the real gradient values or complex gradient values). This is not limited in this embodiment. For example, the output of the neural network is 2p, and the dimension of the first intermediate gradient is also 2p. For another example, a dimension of the output of the neural network is 2, and the output is multiplied by a known matrix whose dimension is 2×2p, so that a multiplied dimension is the same as the dimension of the intermediate gradient. Operations for increasing or decreasing the dimension, for example, a multiplication operation of one or more known matrices and the output, ensure matching of a gradient backhaul dimension.

In this embodiment, the output of the neural network may be mapped to the air interface resource after a linear transformation.

Figure 13:
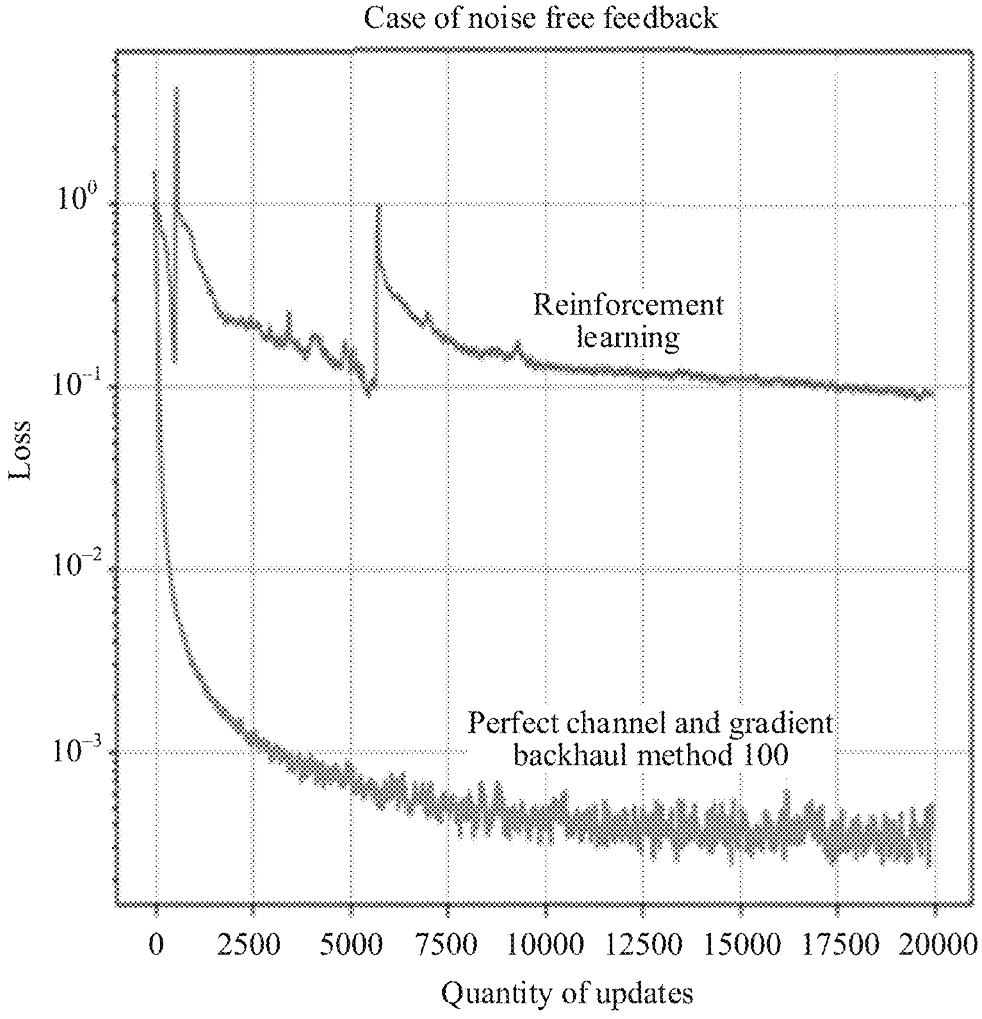
FIG. 13 is a schematic simulation diagram of a loss and a quantity of updates to a parameter of a neural network in a case of noise-free feedback according to at least one embodiment.

In this embodiment, a simulation is separately performed when a perfect channel is available, the gradient transmission method 100 is applied to the OFDM communication system, and the parameter of the first neural network is updated in a reinforcement learning manner. For a relationship diagram of a relationship between a loss and a quantity of updates to the parameter of the neural network in a case of noise free feedback is shown in FIG. 13. As shown in FIG. 13, when the gradient transmission method 100 is applied to the OFDM communication system shown in FIG. 12, a relationship curve of the gradient transmission method 100 coincides with a basic curve in a case of the perfect channel, and when the parameter of the first neural network is updated in the reinforcement learning manner, convergence performance and an update speed of the reinforcement learning manner are far worse than those of the perfect channel. It may be learned that in this embodiment, a speed of joint training of the first communication apparatus and the second communication apparatus is good.

Figure 14:
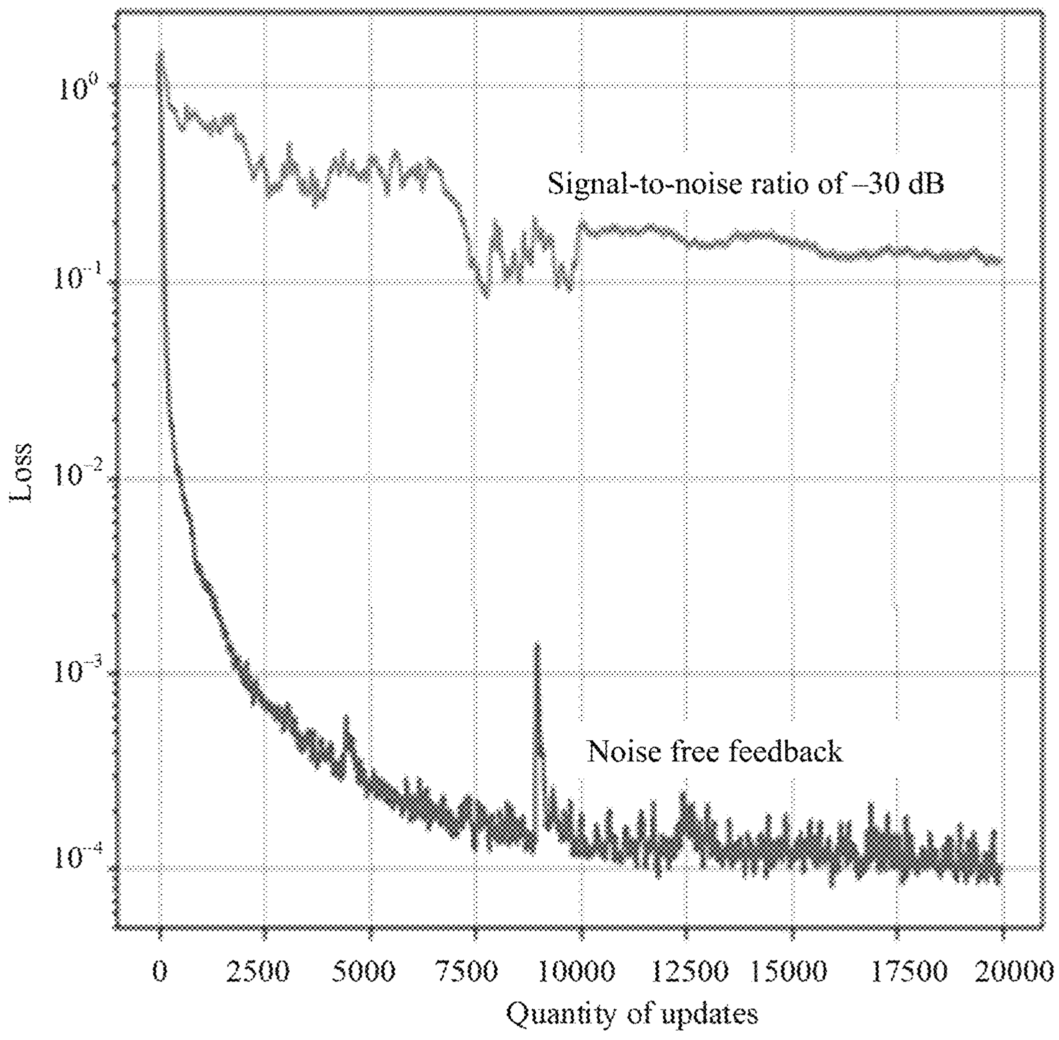
FIG. 14 is a schematic simulation diagram of a loss and a quantity of updates to a parameter of a neural network according to at least one embodiment.
Figure 15:
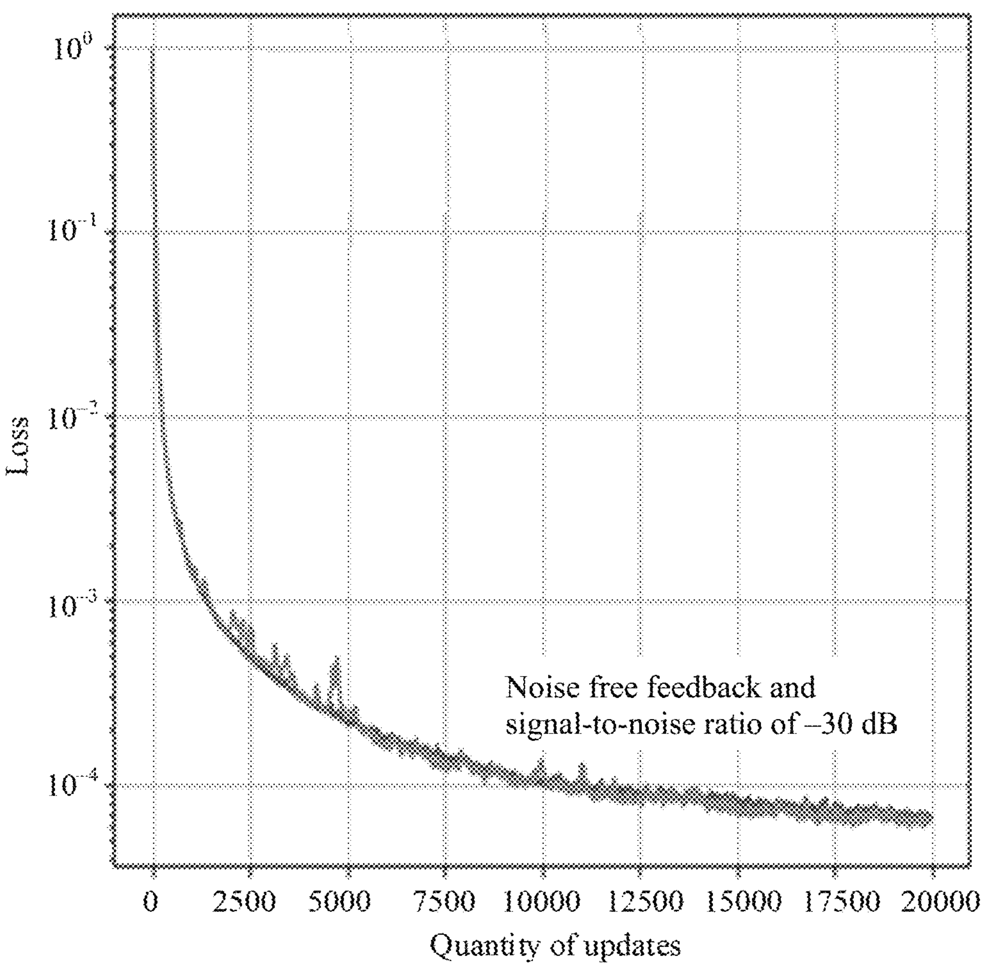
FIG. 15 is another schematic simulation diagram of a loss and a quantity of updates to a parameter of a neural network according to at least one embodiment.

In addition, in this embodiment, a simulation is separately performed when the parameter of the second communication apparatus is updated in the reinforcement learning manner and when the gradient transmission method 100 is applied to the OFDM communication system. Convergence in a case of noise free feedback is different from that in a case in which a signal-to-noise ratio of the feedback is −30 dB. Simulation diagrams are shown in FIG. 14 and FIG. 15 respectively. It may be learned from FIG. 14 that, when the parameter of the second communication apparatus is updated in the reinforcement learning manner, convergence performance is severely degraded when the signal-to-noise ratio of the feedback is −30 dB. However, it may be learned from FIG. 15 that, when the gradient transmission method 100 is applied to the OFDM communication system, convergence performance in a case in which the signal-to-noise ratio of the feedback is −30 dB is basically the same as that in a case of noise free feedback. That is, a capability of resisting noise in this embodiment is strong.

Figure 16:
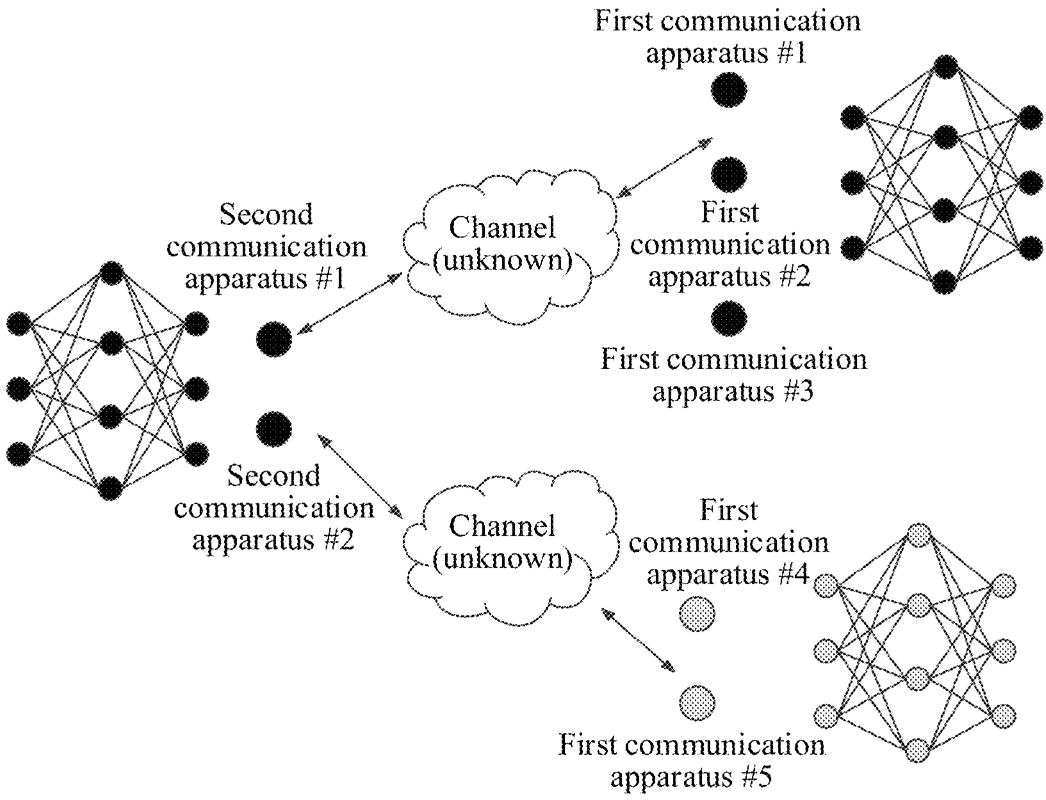
FIG. 16 is an implementation block diagram of a gradient transmission method according to at least one embodiment.
Figures 17, 18:
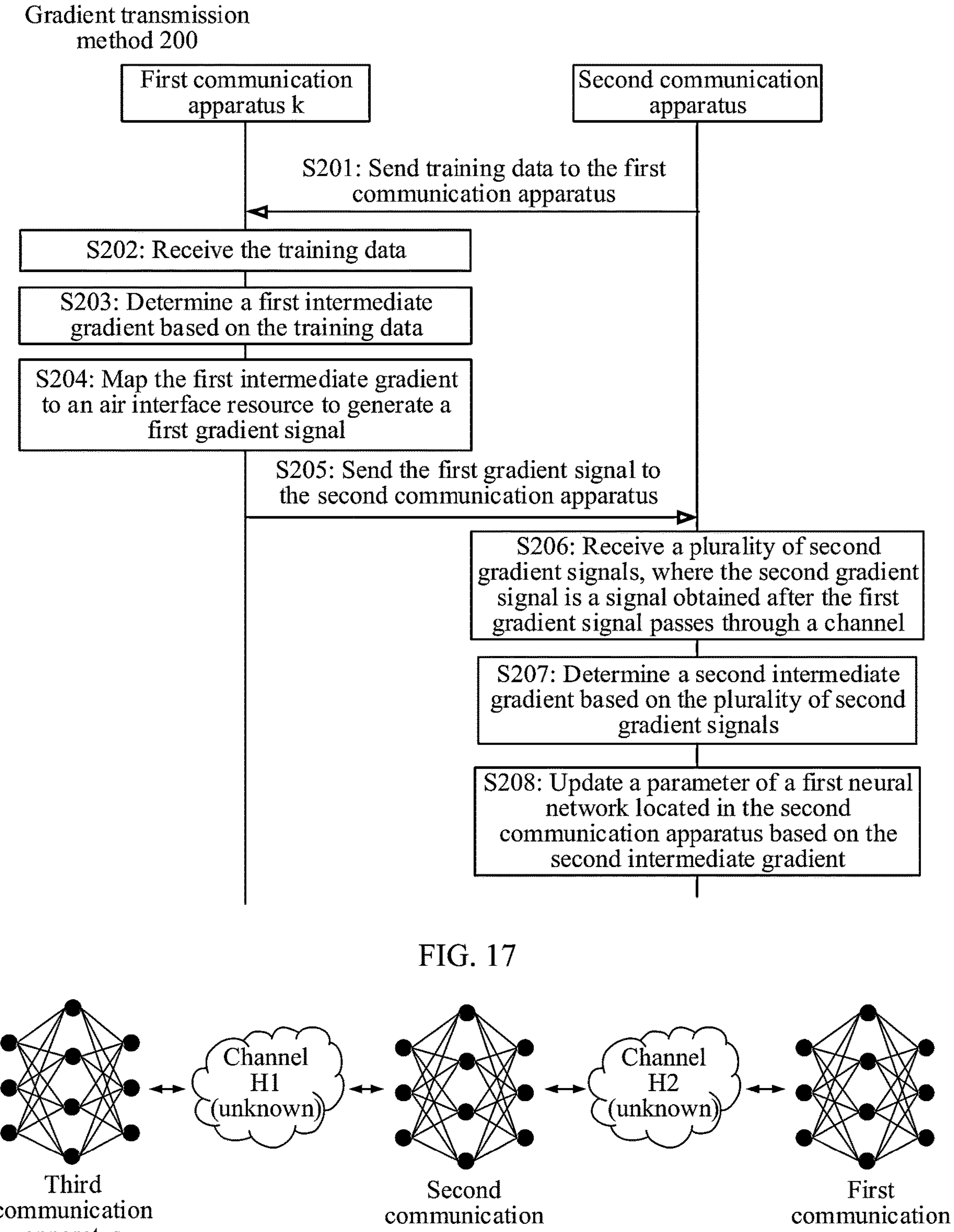
FIG. 17 is a schematic flowchart of another gradient transmission method according to at least one embodiment.
FIG. 18 is an implementation block diagram of another gradient transmission method according to at least one embodiment.

An embodiment described herein further provides a gradient transmission method 200. The gradient transmission method 200 is applicable to a multiple-input multiple-output communication scenario, and channels in the multiple-input multiple-output communication scenario are reciprocal within a coherence time. FIG. 16 is an implementation block diagram of the gradient transmission method 200. As shown in FIG. 16, there are a plurality of second communication apparatuses and a plurality of first communication apparatuses, and one of the second communication apparatuses may communicate with the plurality of first communication apparatuses. FIG. 17 is a schematic flowchart of the gradient transmission method 200. The gradient transmission method 200 includes but is not limited to the following steps.

S201: The second communication apparatus sends training data to the first communication apparatus.

In an optional implementation, the second communication apparatus sends the training data to the first communication apparatuses on M*P air interface resource elements, where both M and P are positive integers.

S202: A first communication apparatus k receives the training data, where k is a positive integer.

The first communication apparatus k is any one of the plurality of first communication apparatuses.

In an optional implementation, the first communication apparatus k receives the training data from the second communication apparatus on $N_k$*P air interface resource elements, where $N_k$ may be determined based on a quantity of antennas of the first communication apparatus.

S203: The first communication apparatus k determines a first intermediate gradient based on the training data.

In an optional implementation, a dimension of the first intermediate gradient is $N_k \times 2p$.

In an optional implementation, before determining the first intermediate gradient, the first communication apparatus may further determine a loss function based on the training data, and update, based on the loss function and a parameter of a neural network located in the first communication apparatus, the parameter of the neural network.

An implementation in which the first communication apparatus k determines the first intermediate gradient based on the training data is the same as the implementation in S102. Details are not described again.

S204: The first communication apparatus k maps the first intermediate gradient to an air interface resource to generate a first gradient signal. The first gradient signal includes one or more gradient symbols, and each of the gradient symbols corresponds to one or more gradient values.

In an optional implementation, that the first communication apparatus k maps the first intermediate gradient to an air interface resource to generate a first gradient signal includes: The first communication apparatus processes the first intermediate gradient by using a first weight, to obtain a weighted first intermediate gradient. The first communication apparatus maps the weighted first intermediate gradient to the air interface resource to generate the first gradient signal.

That the first communication apparatus processes the first intermediate gradient by using a first weight means performing product processing, convolution processing, or the like on the first intermediate gradient and the first weight. In addition, the weighted first intermediate gradient may indicate a degree of credibility or importance of the first intermediate gradient. The first weight may be determined based on a signal-to-noise ratio. The first weight may be determined by the first communication apparatus, or may be indicated by the second communication apparatus to the first communication apparatus by using signaling.

For the implementation in which the first communication apparatus maps the weighted first intermediate gradient to the air interface resource to generate the first gradient signal, refer to the implementation in which the first communication apparatus maps the first intermediate gradient to the air interface resource to generate the first gradient signal in the gradient transmission method 100. Details are not described again.

S205: The first communication apparatus k sends the first gradient signal to the second communication apparatus.

S206: The second communication apparatus receives a plurality of second gradient signals on MP air interface resources. Each second gradient signal is obtained after the first gradient signal passes through a channel.

S207: The second communication apparatus determines a second intermediate gradient based on the plurality of second gradient signals.

The second communication apparatus superimposes the plurality of second gradient signals, and determines the second intermediate gradient based on a superimposed second gradient signal. The second communication apparatus superimposes the plurality of second gradient signals to obtain a weighted sum or an average value of the plurality of second gradient signals.

S208: The second communication apparatus updates the parameter of the first neural network located in the second communication apparatus based on the second intermediate gradient.

The implementations of S205 to S208 are the same as those of S104 to S107. Details are not described again.

In this embodiment, for an implementation in which the first communication apparatus generates the first gradient signal based on the first intermediate gradient, and sends the first gradient signal to the second communication apparatus, refer to S101 to S107. Details are not described again.

It may be learned that in this embodiment, in a multi-user multiple-input multiple-output communication scenario, any first communication apparatus may perform reverse transmission of the first intermediate gradient to the second communication apparatus in a form of the first gradient signal, so that the second communication apparatus obtains a plurality of first gradient signals. Therefore, the second communication apparatus accurately updates the parameter of the first neural network based on the plurality of first gradient signals, to complete joint training of the first communication apparatus and the second communication apparatus.

The gradient transmission method 200 may be further applied to communication scenarios such as multi-user, non-orthogonal multiple access (NOMA), and cooperative multipoint transmission (CoMP).

Figure 19:
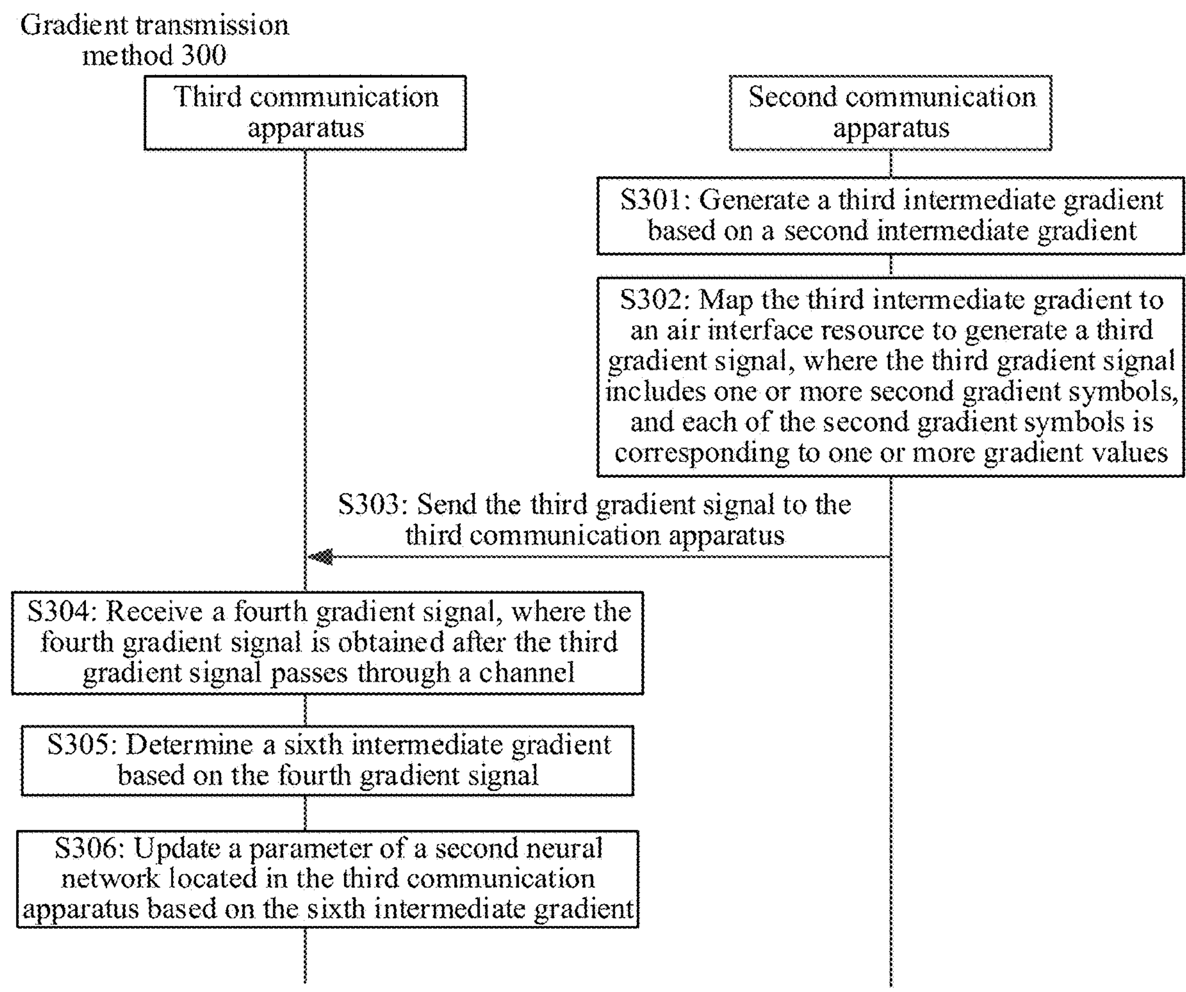
FIG. 19 is a schematic flowchart of still another gradient transmission method according to at least one embodiment.

An embodiment described herein further provides a gradient transmission method 300. The gradient transmission method 300 is applicable to a multi-hop communication scenario, and channels in the multi-hop communication scenario are reciprocal within a coherence time. FIG. 18 is an implementation block diagram of the gradient transmission method 300. As shown in FIG. 18, in the multi-hop communication scenario, a second communication apparatus is a relay node, and a signal transmitted between a first communication apparatus and a third communication apparatus needs to be forwarded by the second communication apparatus. A difference between the gradient transmission method 300 and the gradient transmission method 100 lies in that after the second communication apparatus updates a parameter of a first neural network based on a second intermediate gradient, the method further includes but is not limited to steps shown in FIG. 19.

S301: The second communication apparatus generates a third intermediate gradient based on the second intermediate gradient.

The third intermediate gradient is a gradient that needs to be reversely transmitted by the second communication apparatus to the third communication apparatus.

S302: The second communication apparatus maps the third intermediate gradient to an air interface resource to generate a third gradient signal. The third gradient signal includes one or more second gradient symbols, and each of the second gradient symbols corresponds to one or more gradient values.

In an optional implementation, that the second communication apparatus maps the third intermediate gradient to an air interface resource to generate a third gradient signal includes: converting the gradient values of the third intermediate gradient into the one or more second gradient symbols, and mapping the one or more second gradient symbols to the air interface resource to generate the third gradient signal. It may be learned that the second communication apparatus implements reverse transmission of the third intermediate gradient on the air interface resource by mapping the one or more second gradient symbols to the air interface resource.

The implementation in which the second communication apparatus maps the third intermediate gradient to the air interface resource to generate the third gradient signal is as follows:

1. The third gradient signal includes m complex gradients, and the second gradient symbol is a real number symbol.

If a communication system including the first communication apparatus, the second communication apparatus, and the third communication apparatus transmits a real number symbol, that is, the second gradient symbol is a real number symbol, that the second communication apparatus converts the gradient values of the third intermediate gradient into the one or more second gradient symbols includes: converting the m complex gradient values included in the third intermediate gradient into 2n fifth real number symbols, where m is a positive integer, and n is a positive integer less than or equal to m. Therefore, the one or more second gradient symbols include the 2n fifth real number symbols.

It may be learned that when the communication system including the first communication apparatus, the second communication apparatus, and the third communication apparatus transmits the real number symbol, and the third intermediate gradient includes the m complex gradient values, the second communication apparatus converts the m complex gradient values into the 2n fifth real number symbols. In this way, the second communication apparatus maps the 2n fifth real number symbols to the air interface resource to generate the third gradient signal, so that the second communication apparatus transmits the third intermediate gradient on the air interface resource.

In an optional implementation, that the second communication apparatus converts m complex gradient values included in the third intermediate gradient into 2n fifth real number symbols includes: The second communication apparatus determines that a real part and an imaginary part of any one of the m complex gradient values included in the third intermediate gradient are one fifth real number symbol, to obtain the 2n fifth real number symbols.

In another optional implementation, the second communication apparatus determines that a real part and an imaginary part of any one of the m complex gradient values included in the third intermediate gradient are one fifth real number symbol, to obtain the 2n fifth real number symbols, and maps the 2n fifth real number symbols to the air interface resource to generate the third gradient signal.

2. The third gradient signal includes m real gradients, and the second gradient symbol is a real number symbol.

In an optional implementation, if the communication system including the first communication apparatus, the second communication apparatus, and the third communication apparatus transmits a real number symbol, that is, the third gradient symbol is a real number symbol, that the second communication apparatus converts the gradient values of the third intermediate gradient into one or more second gradient symbols includes: The second communication apparatus converts the m real gradient values included in the third intermediate gradient into n sixth real number symbols, where m is a positive integer, and n is a positive integer less than or equal to m. Therefore, the one or more second gradient symbols include the n sixth real number symbols.

It may be learned that when the communication system including the first communication apparatus, the second communication apparatus, and the third communication apparatus transmits the real number symbol, and the third intermediate gradient includes the m real gradient values, the second communication apparatus converts the m real gradient values into the n sixth real number symbols. In this way, the second communication apparatus maps the n sixth real number symbols to the air interface resource to generate the third gradient signal, so that the second communication apparatus transmits the third intermediate gradient on the air interface resource.

In an optional implementation, if n is less than m, that the second communication apparatus converts the m real gradient values included in the third intermediate gradient into n sixth real number symbols includes: The second communication apparatus determines that n of the m real gradient values included in the third intermediate gradient are the n sixth real number symbols. In this implementation, the m real gradient values do not need to be converted, so that signaling overheads of the second communication apparatus can be reduced.

In an optional implementation, that the second communication apparatus converts 2m real gradient values included in the third intermediate gradient into n sixth complex number symbols includes: determining that any two of the 2m real gradient values included in the third intermediate gradient are a real part and an imaginary part of one sixth complex number symbol, to obtain the n sixth complex number symbols.

In another optional implementation, if n is equal to m, that the second communication apparatus converts the m real gradient values included in the third intermediate gradient into n sixth real number symbols includes: The second communication apparatus determines that the m real gradient values included in the third intermediate gradient are the n sixth real number symbols. Optionally, in this case, to prevent convergence of training from being affected by excessively loud noise of the gradient sent back when an actual part of the air interface resource is at deep attenuation, some of the m sixth real number symbols in the reverse transmission may be set to 0. Specific sixth real number symbols set to 0 are detected by the second communication apparatus or indicated by the third communication apparatus.

In still another optional implementation, when the third intermediate gradient is a third intermediate gradient obtained after power normalization, the second communication apparatus converts m real gradient values included in the normalized third intermediate gradient into n sixth real number symbols. In this case, the n sixth real number symbols are not equal to the n real gradient values included in the third intermediate gradient.

3. The third gradient signal includes m complex gradients, and the second gradient symbol is a real number symbol.

In still another optional implementation, when the communication system including the first communication apparatus, the second communication apparatus, and the third communication apparatus transmits a real number symbol, that is, the second gradient symbol is a complex number symbol, that the second communication apparatus converts the gradient values of the third intermediate gradient into the one or more second gradient symbols includes: converting the m complex gradient values included in the third intermediate gradient into n fifth complex number symbols, where m is a positive integer, and n is a positive integer less than or equal to m; or converting m real gradient values included in the third intermediate gradient into n fifth complex number symbols, where m is a positive integer, and n is a positive integer less than or equal to $\lceil m/2 \rceil$. Therefore, the one or more second gradient symbols include the n fifth complex number symbols.

It may be learned that when the communication system including the first communication apparatus, the second communication apparatus, and the third communication apparatus transmits the real number symbol, and the third intermediate gradient includes the m complex gradient values, the second communication apparatus converts the m complex gradient values into the n fifth complex number symbols, and maps the n fifth complex number symbols to the air interface resource to generate the third gradient signal, so that the second communication apparatus may transmit the third intermediate gradient through the air interface.

In an optional implementation, that the second communication apparatus converts the m complex gradient values included in the third intermediate gradient into n fifth complex number symbols includes: The second communication apparatus determines that a real part of any one of the m complex gradient values included in the third intermediate gradient is a real part of one fifth complex number symbol, and determines that an imaginary part of the complex gradient value is an imaginary part of the fifth complex number symbol, to obtain the n fifth complex number symbols. That is, the determined real part of the fifth complex number symbol corresponds to the real part of the complex gradient value, and the imaginary part of the fifth complex number symbol corresponds to the imaginary part of the complex gradient value. In this implementation, the second communication apparatus maps conjugates of the n fifth complex number symbols to the air interface resource to generate the third gradient signal.

In another optional implementation, that the second communication apparatus converts the m complex gradient values included in the third intermediate gradient into n fifth complex number symbols includes: The second communication apparatus determines that an imaginary part of any one of the m complex gradient values included in the third intermediate gradient is a real part of one fifth complex number symbol, and determines that a real part of the complex gradient value is an imaginary part of the fifth complex number symbol, to obtain the n fifth complex number symbols. That is, the determined real part of the fifth complex number symbol corresponds to the imaginary part of the complex gradient value, and the imaginary part of the fifth complex number symbol corresponds to the real part of the complex gradient value. In this implementation, the second communication apparatus maps the n fifth complex number symbols to the air interface resource to generate the third gradient signal.

4. The third gradient signal includes 2m real gradients, and the second gradient symbol is a real number symbol.

In still another optional implementation, if the communication system including the first communication apparatus, the second communication apparatus, and the third communication apparatus transmits a complex number symbol, that is, the second gradient symbol is a complex number symbol, that the second communication apparatus converts the gradient values of the third intermediate gradient into the one or more second gradient symbols includes: The second communication apparatus converts the m real gradient values included in the third intermediate gradient into n sixth complex number symbols, where m is a positive integer, and n is a positive integer less than or equal to $\lceil m/2 \rceil$. Therefore, the one or more second gradient symbols include the n sixth complex number symbols.

It may be learned that when the communication system including the first communication apparatus, the second communication apparatus, and the third communication apparatus transmits the complex number symbol, and the third intermediate gradient value includes the 2m real gradients, the second communication apparatus converts the 2m real gradient values into the n sixth complex number symbols, and maps the n sixth complex number symbols to the air interface resource to generate the third gradient signal, so that the second communication apparatus reversely transmits the third intermediate gradient on a wireless air interface resource.

In an optional implementation, that the second communication apparatus converts the 2m real gradient values included in the third intermediate gradient into n sixth complex number symbols includes: The second communication apparatus determines that any two of the 2m real gradient values included in the third intermediate gradient are a real part and an imaginary part of one sixth complex number symbol, to obtain the n sixth complex number symbols.

S303: The second communication apparatus sends the third gradient signal to the third communication apparatus. The third communication apparatus is connected to the second communication apparatus.

S304: The third communication apparatus receives a fourth gradient signal. The fourth gradient signal is obtained after the third gradient signal passes through a channel.

S305: The third communication apparatus determines a sixth intermediate gradient based on the fourth gradient signal.

For the implementation in which the third communication apparatus determines the sixth intermediate gradient based on the fourth gradient signal, refer to the foregoing implementation in which the second communication apparatus determines the second intermediate gradient based on the second gradient signal. Details are not described again.

S306: The third communication apparatus updates a parameter of a second neural network located in the third communication apparatus based on the sixth intermediate gradient.

The third communication apparatus computes a partial derivative of the parameter of the second neural network by using the sixth intermediate gradient, to update the parameter of the second neural network based on a value of the partial derivative.

The third intermediate gradient in this embodiment may alternatively be a normalized third intermediate gradient. For an implementation in which the second communication apparatus normalizes the third intermediate gradient, refer to the foregoing implementation in which the first communication apparatus normalizes the first intermediate gradient.

Details are not described again.

It may be learned that in the multi-hop communication scenario, the first communication apparatus may perform reverse transmission of the first intermediate gradient to the second communication apparatus in a manner of sending the first gradient signal, and the second communication apparatus perform reverse transmission of the third intermediate gradient determined based on the second intermediate gradient to the third communication apparatus in a manner of sending the third gradient signal, so that the third communication apparatus updates the parameter of the second neural network based on the third intermediate gradient. In this implementation, both the second communication apparatus and the third communication apparatus obtain the reversely transmitted intermediate gradients, so that the second communication apparatus and the third communication apparatus may update a parameter of a corresponding neural network based on an accurate gradient, to complete joint training of the first communication apparatus and the second communication apparatus.

Figure 20:
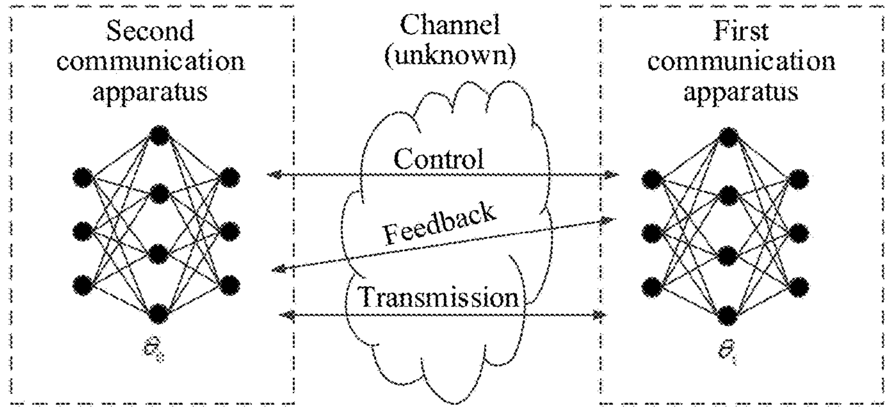
FIG. 20 is an implementation block diagram of still another gradient transmission method according to at least one embodiment.
Figure 21:
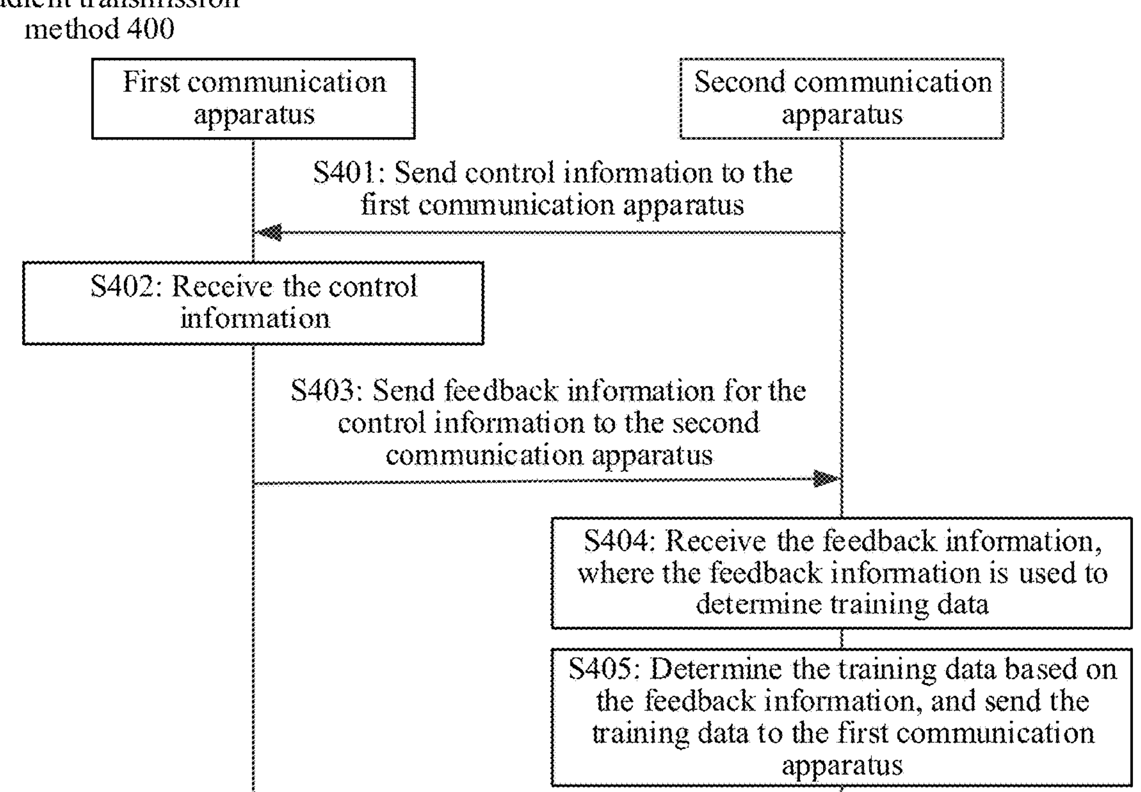
FIG. 21 is a schematic flowchart of still another gradient transmission method according to at least one embodiment.

An embodiment described herein further provides a gradient transmission method 400. The gradient transmission method 400 is applicable to a scenario of control, feedback, transmission, and joint training, and channels in the communication scenario are reciprocal within a coherence time. FIG. 20 is an implementation block diagram of the gradient transmission method 400. As shown in FIG. 20, before a first communication apparatus communicates with a second communication apparatus, the second communication apparatus further sends control information to the first communication apparatus, and the first communication apparatus provides a feedback for the control information to the second communication apparatus. In this case, a difference between the gradient transmission method 400 and the gradient transmission method 100 lies in that before the first communication apparatus receives training data, the method further includes but is not limited to the steps shown in FIG. 21.

S401: The second communication apparatus sends the control information to the first communication apparatus.

The control information includes a pilot.

S402: The first communication apparatus receives the control information.

The first communication apparatus obtains the pilot by receiving the control information.

S403: The first communication apparatus sends feedback information for the control information to the second communication apparatus.

The feedback information is feedback information for the control information. To be specific, the first communication apparatus determines the feedback information based on the pilot and a channel that are included in the control information, and the feedback information is a function related to the channel. The feedback information is used to indicate preprocessing of the training data. For example, the feedback information indicates a precoding matrix (PMI), and is used to indicate that precoding processing needs to be performed on the training data based on the precoding matrix.

S404: The second communication apparatus receives the feedback information. The feedback information is used to determine the training data.

S405: The second communication apparatus determines the training data based on the feedback information, and sends the training data to the first communication apparatus.

Figure 22:
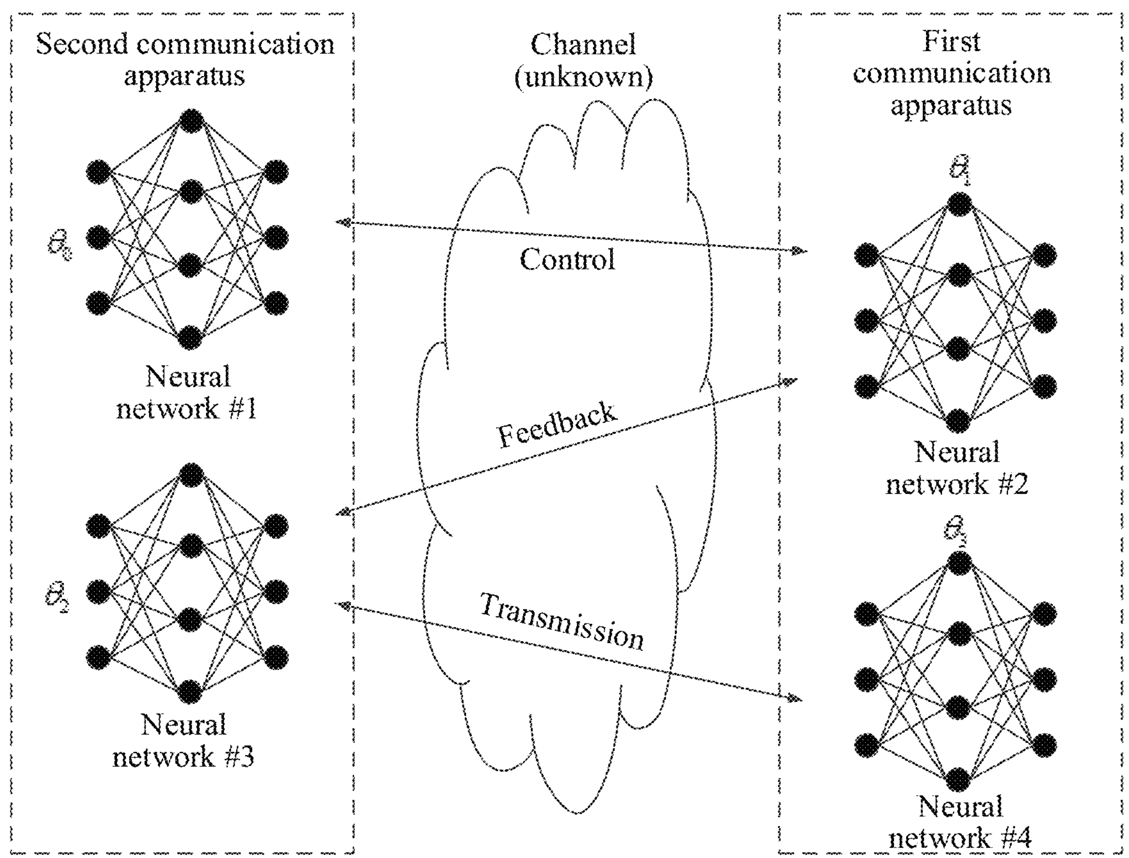
FIG. 22 is an implementation block diagram of still another gradient transmission method according to at least one embodiment.

In the implementation block diagram shown in FIG. 20, the first communication apparatus includes a neural network, and the second communication apparatus includes a neural network. In another optional implementation, the first communication apparatus and the second communication apparatus each may include two neural networks. As shown in FIG. 22, the first communication apparatus is provided with a neural network #1 and a neural network #3, and the second communication apparatus is provided with a neural network #2 and a neural network #4. The neural network #1 is configured to send a pilot to the neural network #2, the neural network #2 is configured to send feedback information to the neural network #3, and the neural network #3 and the neural network #4 are configured to perform transmission.

It may be learned that in this embodiment, the training data sent by the second communication apparatus to the first communication apparatus is determined based on the feedback information fed back by the first communication apparatus. This manner can improve reliability of the training data. This facilitates improving reliability of the first intermediate gradient determined by the first communication apparatus based on the training data. Further, when the first communication apparatus reversely transmits the first intermediate gradient to the second communication apparatus, the reliability of updating the first neural network is improved.

Figure 23:
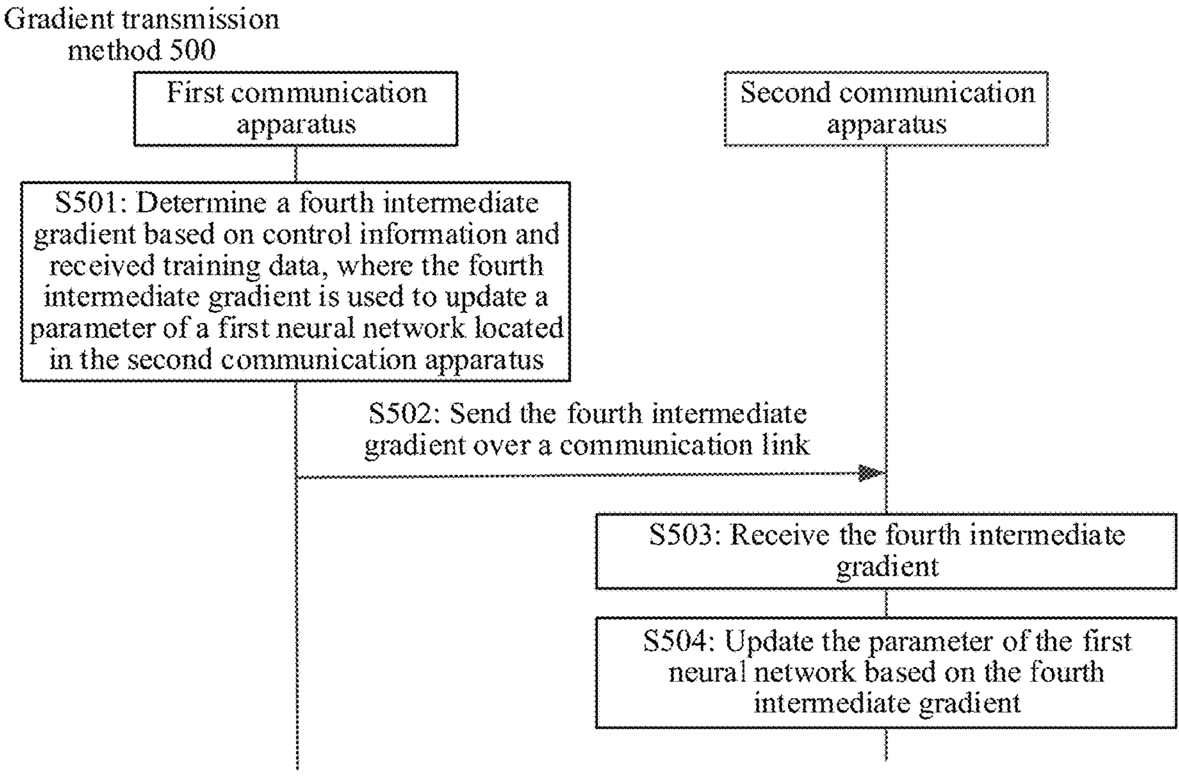
FIG. 23 is a schematic flowchart of still another gradient transmission method according to at least one embodiment.

An embodiment described herein further provides a gradient transmission method 500. The gradient transmission method is applicable to a communication scenario in which channels are not reciprocal within a coherence time. FIG. 23 is a schematic flowchart of the gradient transmission method 500. The gradient transmission method 500 includes but is not limited to the following steps.

S501: A first communication apparatus determines a fourth intermediate gradient based on channel information and received training data. The fourth intermediate gradient is used to update a parameter of a first neural network located in a second communication apparatus.

In an optional implementation, before determining the fourth intermediate gradient, the first communication apparatus further receives a pilot from the second communication apparatus, and estimates a channel based on the pilot to obtain the channel information.

In an optional implementation, that the first communication apparatus determines a fourth intermediate gradient based on channel information and received training data includes: The first communication apparatus determines a first intermediate gradient based on the training data, and multiplies the first intermediate gradient by the channel information to obtain the fourth intermediate gradient. Therefore, the fourth intermediate gradient includes the channel information, and the first communication apparatus transmits an accurate gradient to the second communication apparatus.

S502: The first communication apparatus sends the fourth intermediate gradient over a communication link.

As shown in FIG. 23, the communication link for sending the fourth intermediate gradient is different from a communication link between the first communication apparatus and the second communication apparatus, and the communication link may be a lossless link.

S503: The second communication apparatus receives the fourth intermediate gradient.

S504: The second communication apparatus updates the parameter of the first neural network based on the fourth intermediate gradient.

Figure 24:
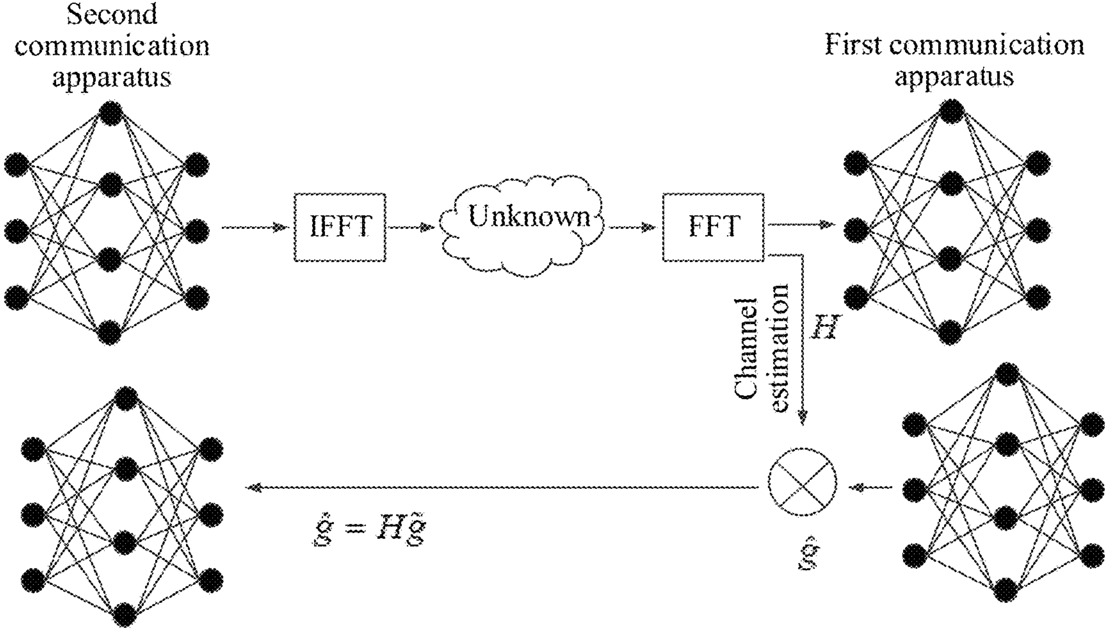
FIG. 24 is an implementation block diagram of still another gradient transmission method according to at least one embodiment.

An implementation block diagram implemented in this embodiment is shown in FIG. 24. The implementation block diagram includes an IFFT module and an FFT module. Optionally, the IFFT module and the FFT module may be replaced with other data processing modules. Alternatively, before and/or after processing by the IFFT module and/or the FFT module, the communication system further includes another processing module, and the processing module is configured to process data.

It may be learned from FIG. 24 that before sending the fourth intermediate gradient to the second communication apparatus, the first communication apparatus performs channel estimation on the channel to obtain channel information H, and determines, based on the channel information and the training data, the fourth intermediate gradient to be sent to the second communication apparatus. Because the fourth intermediate gradient is sent to the second communication apparatus over the communication link, the second communication apparatus can obtain the accurate fourth intermediate gradient, and therefore may update the parameter of the first neural network based on the fourth intermediate gradient.

An embodiment described herein further provides a gradient transmission method 600. In the gradient transmission method 600, a first communication apparatus determines a first intermediate gradient based on received training data, where the first intermediate gradient is used to update a parameter of a first neural network located in a second communication apparatus; and sends the first intermediate gradient and a pilot to the second communication apparatus over a communication link for receiving the training data. Then, the second communication apparatus performs channel estimation based on the pilot to obtain channel information, and obtains a fifth intermediate gradient based on the channel information and the first intermediate gradient. The fifth intermediate gradient is an accurate gradient of the second communication apparatus. Further, the second communication apparatus accurately updates the parameter of the first neural network based on the fifth intermediate gradient, to complete joint training of the first communication apparatus and the second communication apparatus.

To implement the functions in the methods provided in embodiments, the first communication apparatus or the second communication apparatus may include a hardware structure and/or a software module to implement the functions in a form of the hardware structure, the software module, or a combination of the hardware structure and the software module. Whether a function in the foregoing functions is performed by using the hardware structure, the software module, or the combination of the hardware structure and the software module depends on particular applications and design constraints of the technical solutions.

Figure 25:
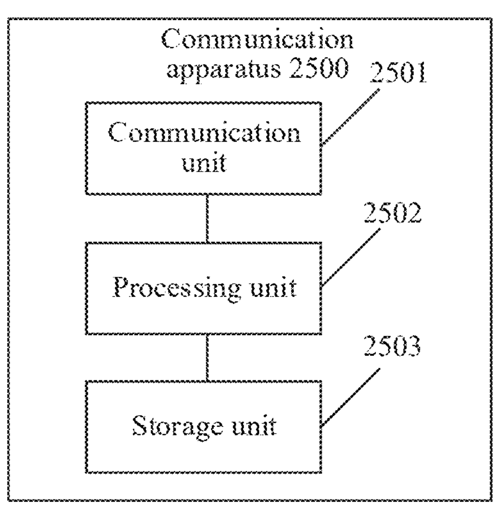
FIG. 25 is a schematic diagram of a structure of a communication apparatus according to at least one embodiment.

FIG. 25 shows a communication apparatus 2500 according to at least one embodiment. The communication apparatus 2500 may be a component (for example, an integrated circuit or a chip) of a first communication apparatus, or may be a component (for example, an integrated circuit or a chip) of a second communication apparatus. The communication apparatus 2500 may alternatively be another communication unit, and is configured to implement the method in the method embodiments. The communication apparatus 2500 may include a communication unit 2501 and a processing unit 2502. Optionally, a storage unit 2503 may be further included.

In a possible design, one or more units in FIG. 25 may be implemented by one or more processors, may be implemented by one or more processors and memories, may be implemented by one or more processors and transceivers, or may be implemented by one or more processors, memories, and transceivers. This is not limited in this embodiment. The processor, the memory, and the transceiver may be separately disposed, or may be integrated.

The communication apparatus 2500 has a function of implementing the first communication apparatus described in at least one embodiment. Optionally, the communication apparatus 2500 has a function of implementing the second communication apparatus described in at least one embodiment. For example, the communication apparatus 2500 includes a module, unit, or means corresponding to a step that is performed by the first communication apparatus and that is related to the first communication apparatus described in at least one embodiment. The module, unit, or means may be implemented by software, implemented by hardware, may be implemented by executing corresponding software by hardware, or may be implemented by combining the software and the hardware. For details, refer to the corresponding descriptions in the foregoing corresponding method embodiments.

In a possible design, the communication apparatus 2500 may include:

- the communication unit 2501, configured to receive training data; and
- the processing unit 2502, configured to determine a first intermediate gradient based on the training data, where the first intermediate gradient is used to update a parameter of a first neural network located in a second communication apparatus, where
- the processing unit 2502 is further configured to map the first intermediate gradient to an air interface resource to generate a first gradient signal, where the first gradient signal includes one or more first gradient symbols, and each of the first gradient symbols corresponds to one or more gradient values of the first intermediate gradient; and
- the communication unit 2501 is further configured to send the first gradient signal to the second communication apparatus.

In an optional implementation, the first intermediate gradient is further used to update a parameter of a second neural network located in a third communication apparatus. A communication connection is established between the third communication apparatus and the second communication apparatus.

In an optional implementation, when mapping the first intermediate gradient to the air interface resource to generate the first gradient signal, the processing unit 2502 is specifically configured to: convert the gradient values of the first intermediate gradient into the one or more first gradient symbols, and map the one or more first gradient symbols to the air interface resource to generate the first gradient signal.

In an optional implementation, if the first gradient symbol is a real number symbol, when converting the gradient values of the first intermediate gradient into the one or more first gradient symbols, the processing unit 2502 is specifically configured to: convert p complex gradient values included in the first intermediate gradient into 2m first real number symbols, where p is a positive integer, and m is a positive integer less than or equal to p; or convert p real gradient values included in the first intermediate gradient into m second real number symbols, where p is a positive integer, and m is a positive integer less than or equal to p.

In another optional implementation, if the first gradient symbol is a complex number symbol, when converting the gradient values of the first intermediate gradient into the one or more first gradient symbols, the processing unit 2502 is specifically configured to: convert p complex gradient values included in the first intermediate gradient into m first complex number symbols, where p is a positive integer, and m is a positive integer less than or equal to p; or convert p real gradient values included in the first intermediate gradient into m second complex number symbols, where p is a positive integer, and m is a positive integer less than or equal to $\lceil p/2 \rceil$.

In an optional implementation, when mapping the one or more first gradient symbols to the air interface resource to generate the first gradient signal, the processing unit 2502 is specifically configured to map conjugates of the m first complex number symbols or conjugates of the m second complex number symbols to the air interface resource to generate the first gradient signal.

In an optional implementation, the first intermediate gradient mapped to the air interface resource is a first intermediate gradient obtained after power normalization.

In an optional implementation, the communication unit 2501 is further configured to send feedback information to the second communication apparatus. The feedback information is used to determine the training data.

In an optional implementation, when mapping the first intermediate gradient to the air interface resource to generate the first gradient signal, the processing unit 2502 is specifically configured to: process the first intermediate gradient by using a first weight to obtain a weighted first intermediate gradient, and map the weighted first intermediate gradient to the air interface resource to generate the first gradient signal.

This embodiment and the foregoing method embodiments are based on a same concept, and technical effects brought by this embodiment and the method embodiments are also the same. For a specific principle, refer to the descriptions in the foregoing method embodiments. Details are not described herein again.

In another possible design, the communication apparatus 2500 may include:

- the communication unit 2501, configured to receive one or more second gradient signals, where the second gradient signal is a signal obtained after a first gradient signal passes through a channel, the first gradient signal is generated by mapping a first intermediate gradient to an air interface resource, the first gradient signal includes one or more first gradient symbols, each of the first gradient symbols corresponds to one or more gradient values of the first intermediate gradient, the first intermediate gradient is determined based on training data, and the first intermediate gradient is used to update a parameter of a first neural network located in the second communication apparatus; and
- the processing unit 2502, configured to determine a second intermediate gradient based on the one or more second gradient signals, where
- the processing unit 2502 is further configured to update the parameter of the first neural network based on the second intermediate gradient.

In an optional implementation, the second gradient signals include 2m third real number symbols, the third real number symbol is a signal obtained after a first real number symbol passes through a channel, and m is a positive integer; and when determining the second intermediate gradient based on the one or more second gradient signals, the processing unit 2502 is specifically configured to convert the 2m third real number symbols into m complex gradient values of the second intermediate gradient.

In another optional implementation, the second gradient signals include m fourth real number symbols, and the fourth real number symbol is a signal obtained after a second real number symbol passes through a channel, where m is a positive integer; and when determining the second intermediate gradient based on the one or more second gradient signals, the processing unit 2502 is specifically configured to determine that the m fourth real number symbols are m real gradient values of the second intermediate gradient.

In still another optional implementation, the second gradient signals include m third complex number symbols, the third complex number symbol is a signal obtained after a first complex number symbol passes through a channel, and m is a positive integer; and when determining the second intermediate gradient based on the one or more second gradient signals, the processing unit 2502 is specifically configured to convert the m third complex number symbols into m complex gradient values of the second intermediate gradient.

In still another optional implementation, the second gradient signals include m fourth complex number symbols, and the fourth complex number symbol is a signal obtained after a second complex number symbol passes through a channel, where m is a positive integer; and when determining the second intermediate gradient based on the one or more second gradient signals, the processing unit 2502 is specifically configured to convert the m fourth complex number symbols into 2m real gradient values of the second intermediate gradient.

In an optional implementation, the processing unit 2502 is further configured to: generate a third intermediate gradient based on the second intermediate gradient, and map the third intermediate gradient to an air interface resource to generate a third gradient signal, where the third gradient signal includes one or more second gradient symbols, and each of the second gradient symbols corresponds to one or more gradient values of the third intermediate gradient; and send the third gradient signal to a third communication apparatus, where a communication connection is established between the third communication apparatus and the second communication apparatus.

In an optional implementation, when mapping the third intermediate gradient to the air interface resource to generate the third gradient signal, the processing unit 2502 is specifically configured to: convert the gradient values of the third intermediate gradient into the one or more second gradient symbols, and map the one or more second gradient symbols to the air interface resource to generate the third gradient signal.

In an optional implementation, the second gradient symbol is a real number symbol, and when converting the gradient values of the third intermediate gradient into the one or more second gradient symbols, the processing unit 2502 is specifically configured to: convert m complex gradient values included in the third intermediate gradient into 2n fifth real number symbols, where m is a positive integer, and n is a positive integer less than or equal to m; or convert m real gradient values included in the third intermediate gradient into n sixth real number symbols, where m is a positive integer, and n is a positive integer less than or equal to m.

In another optional implementation, the second gradient symbol is a complex number symbol, and when converting the gradient values of the third intermediate gradient into the one or more second gradient symbols, the processing unit 2502 is specifically configured to: convert m complex gradient values included in the third intermediate gradient into n fifth complex number symbols, where m is a positive integer, and n is a positive integer less than or equal to m; or convert m real gradient values included in the third intermediate gradient into n sixth complex number symbols, where m is a positive integer, and n is a positive integer less than or equal to ⌈m/2⌉.

In an optional implementation, when mapping the one or more second gradient symbols to the air interface resource to generate the third gradient signal, the processing unit 2502 is specifically configured to map conjugates of the n fifth complex number symbols or conjugates of the n sixth complex number symbols to the air interface resource to generate the third gradient signal.

This embodiment and the foregoing method embodiments are based on a same concept, and technical effects brought by this embodiment and the method embodiments are also the same. For a specific principle, refer to the descriptions in the foregoing method embodiments. Details are not described herein again.

Figure 26:
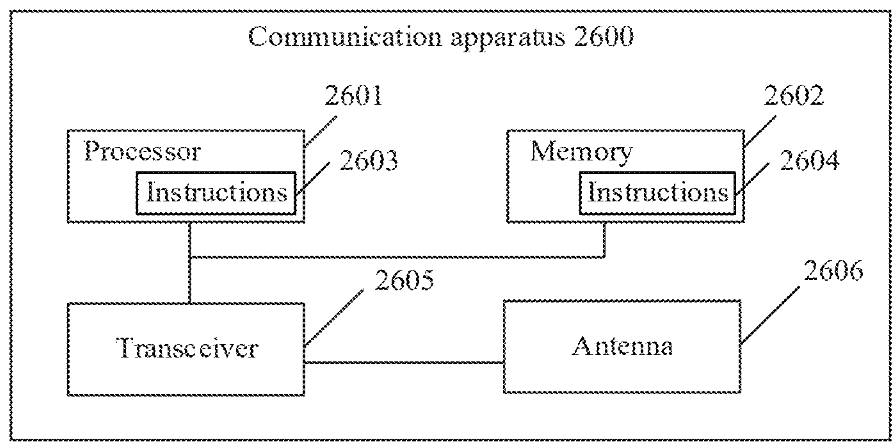
FIG. 26 is a schematic diagram of a structure of another communication apparatus according to at least one embodiment.

An embodiment described herein further provides a communication apparatus 2600. FIG. 26 is a schematic diagram of a structure of the communication apparatus 2600. The communication apparatus 2600 may be a first communication apparatus or a second communication apparatus, may be a chip, a chip system, a processor, or the like that supports the first communication apparatus in implementing the foregoing method, or may be a chip, a chip system, a processor, or the like that supports the second communication apparatus in implementing the foregoing method. The apparatus may be configured to implement the method in the foregoing method embodiments. For details, refer to the descriptions in the foregoing method embodiments.

The communication apparatus 2600 may include one or more processors 2601. The processor 2601 may be a general-purpose processor, a dedicated processor, or the like. For example, the processor 2601 may be a baseband processor, a digital signal processor, an application-specific integrated circuit, a field programmable gate array or another programmable logic device, a discrete gate or a transistor logic device, a discrete hardware component, or a central processing unit (CPU). The baseband processor may be configured to process a communication protocol and communication data. The central processing unit may be configured to: control a communication apparatus (for example, a base station, a baseband chip, a terminal, a terminal chip, a DU, or a CU), execute a software program, and process data of the software program.

Optionally, the communication apparatus 2600 may include one or more memories 2602. The memory 2602 may store instructions 2604. The instructions may be run on the processor 2601, to enable the communication apparatus 2600 to perform the method described in the foregoing method embodiments. Optionally, the memory 2602 may further store data. The processor 2601 and the memory 2602 may be separately disposed, or may be integrated.

The memory 2602 may include but is not limited to a non-volatile memory such as a hard disk drive (HDD) or a solid-state drive (SSD), a random access memory (RAM), an erasable programmable read-only memory (Erasable Programmable ROM, EPROM), a read-only memory (ROM), a portable read-only memory (CD-ROM), and the like.

Optionally, the communication apparatus 2600 may further include a transceiver 2605 and an antenna 2606. The transceiver 2605 may be referred to as a transceiver unit, a transceiver machine, a transceiver circuit, or the like, and is configured to implement a sending/receiving function. The transceiver 2605 may include a receiver and a transmitter. The receiver may be referred to as a receiver machine, a receiver circuit, or the like, and is configured to implement the receiving function. The transmitter may be referred to as a transmitter machine, a transmitter circuit, or the like, and is configured to implement the sending function.

The communication apparatus 2600 is the first communication apparatus. The transceiver 2605 is configured to: perform S101 and S104 in the gradient transmission method 100, perform S202 and S205 in the gradient transmission method 200, perform S402 and S403 in the gradient transmission method 400, and S502 in the gradient transmission method 500. The processor 2601 is configured to perform S102 and S103 in the gradient transmission method 100, perform S203 and S204 in the gradient transmission method 200, and perform S501 in the gradient transmission method 500.

The communication apparatus 2600 is the second communication apparatus. The transceiver 2605 is configured to: perform S105 in the gradient transmission method 100, perform S206 in the gradient transmission method 200, perform S303 in the gradient transmission method 300, perform S401 and S404 in the gradient transmission method 400, and perform S503 in the gradient transmission method 500. The processor 2601 is configured to: perform S106 and S107 in the gradient transmission method 100, perform S207 and S208 in the gradient transmission method 200, perform S301 and S302 in the gradient transmission method 300, perform S405 in the gradient transmission method 400, and perform S504 in the gradient transmission method 500.

The communication apparatus 2600 is a third communication apparatus. The transceiver 2605 is configured to perform S303 in the gradient transmission method 300. The processor 2601 is configured to perform S304 and S305 in the gradient transmission method 300.

In another possible design, the processor 2601 may include a transceiver configured to implement a receiving and sending function. For example, the transceiver may be a transceiver circuit, an interface, or an interface circuit. Transceiver circuits, interfaces, or interface circuits that are configured to implement the receiving and sending functions may be separate, or may be integrated together. The transceiver circuit, the interface, or the interface circuit may be configured to read or write code/data, or the transceiver circuit, the interface, or the interface circuit may be configured to transmit or transfer a signal.

In still another possible design, optionally, the processor 2601 may store instructions 2603. The instructions 2603 are run on the processor 2601, to enable the communication apparatus 2600 to perform the method described in the foregoing method embodiments. The instructions 2603 may be fixed in the processor 2601. In this case, the processor 2601 may be implemented by hardware.

In still another possible design, the communication apparatus 2600 may include a circuit. The circuit may implement a sending, receiving, or communication function in the foregoing method embodiments. The processor and the transceiver described in this embodiment may be implemented on an integrated circuit (IC), an analog IC, a radio frequency integrated circuit RFIC, a hybrid signal IC, an application-specific integrated circuit (ASIC), a printed circuit board (PCB), an electronic device, or the like. The processor and the transceiver each may be manufactured by using various IC processing technologies, for example, a complementary metal oxide semiconductor (CMOS), an n-type metal oxide semiconductor (nMetal-oxide-semiconductor, NMOS), a p-type metal oxide semiconductor (positive channel metal oxide semiconductor, PMOS), a bipolar junction transistor (BJT), a bipolar CMOS (BiCMOS), silicon germanium (SiGe), and gallium arsenide (GaAs).

The communication apparatus described in the foregoing embodiment may be the first communication apparatus or the second communication apparatus, but a scope of the communication apparatus described in this embodiment is not limited thereto, and a structure of the communication apparatus may not be limited to FIG. 26. The communication apparatus may be an independent device or may be a part of a large device. For example, the communication apparatus may be:

(1) an independent integrated circuit IC, a chip, a chip system, or a subsystem;

(2) a set of one or more ICs, where optionally, the IC set may further include a storage component configured to store data and instructions;

(3) an ASIC, for example, a modem (modulator);

(4) a module that can be embedded in another device;

(5) a receiver, a terminal, an intelligent terminal, a cellular phone, a wireless device, a handset, a mobile unit, a vehicle-mounted device, a network device, a cloud device, an artificial intelligence device, or the like; and (6) others.

Figure 27:
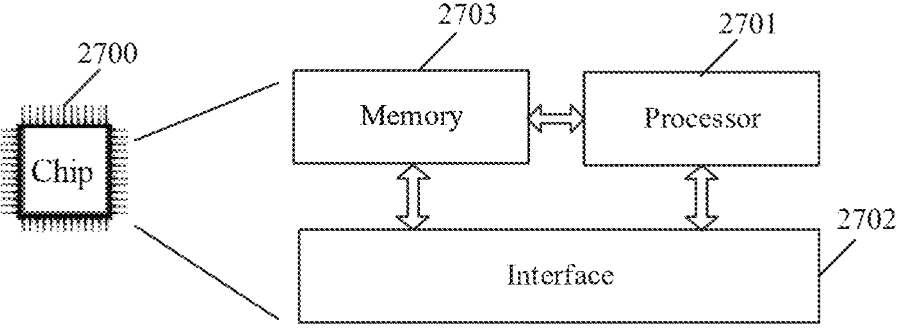
FIG. 27 is a schematic diagram of a structure of a chip according to at least one embodiment.

For a case in which the communication apparatus may be a chip or a chip system, refer to a schematic diagram of a structure of a chip shown in FIG. 27. The chip 2700 shown in FIG. 27 includes a processor 2701 and an interface 2702. There may be one or more processors 2701, and there may be a plurality of interfaces 2702. The chip 2700 may further include a memory 2703.

In a design, for a case in which the chip is configured to implement a function of a first communication apparatus in at least one embodiment:

The interface 2702 is configured to receive training data.

The processor 2701 is configured to determine a first intermediate gradient based on the training data. The first intermediate gradient is used to update a parameter of a first neural network located in a second communication apparatus.

The processor 2701 is further configured to map the first intermediate gradient to an air interface resource to generate a first gradient signal. The first gradient signal includes one or more first gradient symbols, and each of the first gradient symbols corresponds to one or more gradient values of the first intermediate gradient.

The interface 2702 is further configured to send the first gradient signal to the second communication apparatus.

In another design, for a case in which the chip is configured to implement a function of a second communication apparatus in at least one embodiment:

The interface 2702 is configured to receive one or more second gradient signals. The second gradient signal is a signal obtained after a first gradient signal passes through a channel. The first gradient signal is generated by mapping a first intermediate gradient to an air interface resource. The first gradient signal includes one or more first gradient symbols, and each of the first gradient symbols corresponds to one or more gradient values of the first intermediate gradient. The first intermediate gradient is determined based on training data. The first intermediate gradient is used to update a parameter of a first neural network located in the second communication apparatus.

The processor 2701 is configured to determine a second intermediate gradient based on the one or more second gradient signals.

The processor 2701 is further configured to update the parameter of the first neural network based on the second intermediate gradient.

In this embodiment, the communication apparatus 2600 and the chip 2700 may further perform the implementations of the foregoing communication apparatus 2500. A person skilled in the art may further understand that various illustrative logical blocks and steps that are listed in at least one embodiment may be implemented by using electronic hardware, computer software, or a combination thereof. Whether the functions are implemented by using hardware or software depends on particular applications and a design requirement of the entire system. A person skilled in the art may use various methods to implement the described function for each particular application, but it should not be considered that the implementation goes beyond the protection scope of at least one embodiment.

This embodiment and the method embodiments shown in the gradient transmission method 100 to the gradient transmission method 500 are based on a same concept, and technical effects brought by this embodiment and the method embodiments are also the same. For some principle, refer to the foregoing descriptions in the embodiments shown in the gradient transmission method 100 to the gradient transmission method 500. Details are not described again.

A person skilled in the art may further understand that various illustrative logical blocks and steps that are listed in at least one embodiment may be implemented by using electronic hardware, computer software, or a combination thereof. Whether the functions are implemented by using hardware or software depends on particular applications and a design requirement of the entire system. A person skilled in the art may use various methods to implement the described function for each particular application, but it should not be considered that the implementation goes beyond the scope of at least one embodiment.

An embodiment described herein further provides a computer-readable storage medium, configured to store computer software instructions. When the instructions are executed by a communication apparatus, a function of any one of the foregoing method embodiments is implemented.

An embodiment described herein further provides a computer program product, configured to store computer software instructions. When the instructions are executed by a communication apparatus, a function of any one of the foregoing method embodiments is implemented.

An embodiment described herein further provides a computer program. When the computer program is run on a computer, a function of any one of the foregoing method embodiments is implemented.

All or a part of the foregoing embodiments may be implemented by using software, hardware, firmware, or any combination thereof. When the software is used to implement the embodiments, all or a part of the embodiments may be implemented in a form of a computer program product. The computer program product includes one or more computer instructions. When the computer instructions are loaded and executed on a computer, all or some of the procedures or functions according to at least one embodiment are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a high-density digital video disc (DVD)), a semiconductor medium (for example, a solid-state disk (SSD)), or the like.

The foregoing descriptions are merely implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A gradient transmission method comprising:

receiving input data;

determining a first intermediate gradient based on the input data, wherein the first intermediate gradient is used to update a parameter of a first neural network located in a first communication apparatus;

mapping the first intermediate gradient to an air interface resource to generate a first gradient signal including one or more first gradient symbols, and each of the one or more first gradient symbols corresponds to one or more gradient values of the first intermediate gradient; and sending the first gradient signal to the first communication apparatus.

2. The method according to claim 1, wherein the first intermediate gradient is further used to update a parameter of a second neural network located in a second communication apparatus; and a communication connection is established between the second communication apparatus and the first communication apparatus.

3. The method according to claim 1, wherein mapping the first intermediate gradient to the air interface resource to generate the first gradient signal includes:

converting the gradient values of the first intermediate gradient into the one or more first gradient symbols; and mapping the one or more first gradient symbols to the air interface resource to generate the first gradient signal.

4. The method according to claim 3, wherein the first gradient symbol is a real number symbol, and converting the gradient values of the first intermediate gradient into the one or more first gradient symbols includes:

converting p complex gradient values included in the first intermediate gradient into 2m first real number symbols, wherein p is a positive integer, and m is a positive integer less than or equal to p; or converting p real gradient values included in the first intermediate gradient into m second real number symbols, wherein p is a positive integer, and m is a positive integer less than or equal to p.

5. The method according to claim 4, wherein converting p complex gradient values into 2m first real number symbols includes:

determining that a real part and an imaginary part of any one of the p complex gradient values are one first real number symbol, to obtain the 2m first real number symbols.

6. The method according to claim 4, wherein converting p real gradient values into m second real number symbols includes:

determining that m of the p real gradient values are the m second real number symbols.

7. The method according to claim 3, wherein the first gradient symbol is a complex number symbol, and converting the gradient values of the first intermediate gradient into the one or more first gradient symbols includes:

converting p complex gradient values into m first complex number symbols, wherein p is a positive integer, and m is a positive integer less than or equal to p; or converting p real gradient values into m second complex number symbols, wherein p is a positive integer, and m is a positive integer less than or equal to $\lceil p/2 \rceil$.

8. The method according to claim 7, wherein converting p complex gradient values included in the first intermediate gradient into m first complex number symbols includes:

determining that a real part of any one of the p complex gradient values is a real part of one first complex number symbol, and determining that an imaginary part of the complex gradient value is an imaginary part of the first complex number symbol, to obtain the m first complex number symbols.

9. The method according to claim 7, wherein converting p complex gradient values into m first complex number symbols includes:

determining that an imaginary part of any one of the p complex gradient values included in the first intermediate gradient is a real part of one first complex number symbol, and determining that a real part of the complex gradient value is an imaginary part of the first complex number symbol, to obtain the m first complex number symbols.

10. The method according to claim 7, wherein converting p real gradient values into m second complex number symbols includes:

determining that any two of the p real gradient values are a real part and an imaginary part of one second complex number symbol, to obtain the m second complex number symbols.

11. The method according to claim 7, wherein mapping the one or more first gradient symbols to the air interface resource to generate the first gradient signal includes:

mapping conjugates of the m first complex number symbols or conjugates of the m second complex number symbols to the air interface resource to generate the first gradient signal.

12. The method according to claim 1, wherein the first intermediate gradient mapped to the air interface resource is a first intermediate gradient obtained after power normalization.

13. The method according to claim 1, wherein the method further comprises:

sending feedback information used to determine the input data to the first communication apparatus.

14. The method according to claim 1, wherein mapping the first intermediate gradient to an air interface resource to generate a first gradient signal includes:

processing the first intermediate gradient by using a first weight to obtain a weighted first intermediate gradient; and mapping the weighted first intermediate gradient to the air interface resource to generate the first gradient signal.

15. A gradient transmission method comprising:

receiving one or more second gradient signals, wherein the one or more second gradient signals are obtained after a first gradient signal passes through a channel, wherein the first gradient signal is generated by mapping a first intermediate gradient to an air interface resource, the first gradient signal includes one or more first gradient symbols, and each of the first gradient symbols corresponds to one or more gradient values of the first intermediate gradient;

determining a second intermediate gradient based on the one or more second gradient signals; and updating a parameter of a first neural network based on the second intermediate gradient, wherein the one or more second gradient signals include 2m second real number symbols that are obtained after a first real number symbol passes through the channel, and m is a positive integer; and determining a second intermediate gradient based on the one or more second gradient signals includes converting the 2m second real number symbols into m complex gradient values of the second intermediate gradient.

16. The method according to claim 15, wherein the one or more second gradient signals include m second complex number symbols obtained after a first complex number symbol passes through the channel, and m is a positive integer; and determining the second intermediate gradient based on the one or more second gradient signals includes:

converting the m second complex number symbols into m complex gradient values of the second intermediate gradient.

17. The method according to claim 15, wherein the one or more second gradient signals include m second complex number symbols obtained after a first complex number symbol passes through the channel, and m is a positive integer; and determining the second intermediate gradient based on the one or more second gradient signals includes:

converting, by a first communication apparatus, the m second complex number symbols into 2m real gradient values of the second intermediate gradient.

18. A gradient transmission method comprising:

receiving one or more second gradient signals, wherein the one or more second gradient signals are obtained after a first gradient signal passes through a channel, wherein the first gradient signal is generated by mapping a first intermediate gradient to an air interface resource, the first gradient signal includes one or more first gradient symbols, and each of the first gradient symbols corresponds to one or more gradient values of the first intermediate gradient;

determining a second intermediate gradient based on the one or more second gradient signals; and updating a parameter of a first neural network based on the second intermediate gradient, wherein the one or more second gradient signals include m second real number symbols obtained after a first real number symbol passes through the channel, and m is a positive integer; and determining the second intermediate gradient based on the one or more second gradient signals includes:

determining that the m second real number symbols are m real gradient values of the second intermediate gradient.

19. The method according to claim 18, wherein the one or more second gradient signals include m second complex number symbols obtained after a first complex number symbol passes through the channel, and m is a positive integer; and determining the second intermediate gradient based on the one or more second gradient signals includes:

converting the m second complex number symbols into m complex gradient values of the second intermediate gradient.

20. The method according to claim 18, wherein the one or more second gradient signals include m second complex number symbols obtained after a first complex number symbol passes through the channel, and m is a positive integer; and determining the second intermediate gradient based on the one or more second gradient signals includes:

converting, by a first communication apparatus, the m second complex number symbols into 2m real gradient values of the second intermediate gradient.

* * * * *